(12) United States Patent
Taylor et al.

(10) Patent No.: US 8,408,455 B1
(45) Date of Patent: Apr. 2, 2013

(54) SYSTEM AND METHOD FOR GRANTING PROMOTIONAL REWARDS TO BOTH CUSTOMERS AND NON-CUSTOMERS

(75) Inventors: Robert Cameron Taylor, Dublin, OH (US); Jeffrey J. Pilarcik, Columbus, OH (US); Paula M. Ley, Columbus, OH (US)

(73) Assignee: JPMorgan Chase Bank, N.A., New York, NY (US)

(*) Notice: Subject to any disclaimer, the term of this patent is extended or adjusted under 35 U.S.C. 154(b) by 210 days.

(21) Appl. No.: 12/619,072

(22) Filed: Nov. 16, 2009

Related U.S. Application Data

(63) Continuation-in-part of application No. 11/403,317, filed on Apr. 13, 2006, now Pat. No. 7,784,682.

(60) Provisional application No. 60/771,581, filed on Feb. 8, 2006.

(51) Int. Cl.
*G07F 19/00* (2006.01)
(52) U.S. Cl. .......................... 235/380; 235/379
(58) Field of Classification Search .................. 235/375, 235/379, 380, 381, 383; 705/43
See application file for complete search history.

(56) References Cited

U.S. PATENT DOCUMENTS

| | | |
|---|---|---|
| 2,005,003 A | 6/1935 | Patton et al. |
| 3,634,669 A | 1/1972 | Soumas et al. |
| 3,713,235 A | 1/1973 | Roberts |
| 3,938,090 A | 2/1976 | Borison et al. |
| 3,946,206 A | 3/1976 | Darjany |
| 4,047,033 A | 9/1977 | Malmberg et al. |
| 4,058,220 A | 11/1977 | Torongo |
| D248,203 S | 6/1978 | Morse |
| 4,130,881 A | 12/1978 | Haessler et al. |
| 4,205,780 A | 6/1980 | Burns et al. |
| 4,264,808 A | 4/1981 | Owens et al. |
| 4,321,672 A | 3/1982 | Braun et al. |
| 4,338,587 A | 7/1982 | Chiappetti |
| 4,453,074 A | 6/1984 | Weinstein |
| 4,454,414 A | 6/1984 | Benton |
| 4,465,206 A | 8/1984 | Sorel et al. |
| 4,545,838 A | 10/1985 | Minkus et al. |
| 4,575,621 A | 3/1986 | Dreifus |

(Continued)

FOREIGN PATENT DOCUMENTS

| | | |
|---|---|---|
| CA | 2293321 | 12/1998 |
| EP | 0843292 A2 | 5/1998 |

(Continued)

OTHER PUBLICATIONS

5500—FDIC General Counsel's Opinion No. 8—Stored Value Cards, 61 Fed. Reg. 40490, http//www.fdic.gov/regulations/laws/rules/5500-500.html, Aug. 2, 1996.

(Continued)

*Primary Examiner* — Kristy A Haupt
(74) *Attorney, Agent, or Firm* — Hunton & Williams LLP

(57) ABSTRACT

Aspects of the invention include systems and methods of using an Automated Teller Machine (ATM) to access a rewards account. The customer may access the ATM using a card or other device. Account information associated with the customer, including a rewards account, may be retrieved by the ATM. Through the ATM, the customer may perform actions upon the rewards account. The actions may include, but are not limited to, a balance inquiry, a withdrawal and/or redemption, an account transfer, and preferences. Subsequent to, or coincident with, a withdrawal/redemption or account transfer, the rewards account may be debited an appropriate amount to equate to the amount of the withdrawal/redemption or account transfer. Following the completion of the customer's transaction, a receipt may be dispensed from the ATM. The receipt may include the rewards account balance.

32 Claims, 5 Drawing Sheets

U.S. PATENT DOCUMENTS

| | | |
|---|---|---|
| 4,582,985 A | 4/1986 | Lofberg |
| 4,605,844 A | 8/1986 | Haggan |
| 4,614,861 A | 9/1986 | Pavlov et al. |
| 4,634,845 A | 1/1987 | Riley et al. |
| 4,643,452 A | 2/1987 | Chang et al. |
| 4,650,981 A | 3/1987 | Foletta |
| 4,669,730 A | 6/1987 | Small |
| 4,689,478 A | 8/1987 | Hale et al. |
| 4,697,072 A | 9/1987 | Kawana |
| 4,700,055 A | 10/1987 | Kashkashian, Jr. |
| 4,701,601 A | 10/1987 | Francini et al. |
| 4,723,212 A | 2/1988 | O'Brien et al. |
| 4,746,787 A | 4/1988 | Okada |
| 4,750,119 A | 6/1988 | Robertson et al. |
| 4,752,676 A | 6/1988 | Leonard et al. |
| 4,754,418 A | 6/1988 | Hara |
| 4,766,293 A | 8/1988 | Boston |
| 4,766,539 A | 8/1988 | Fox |
| 4,789,928 A | 12/1988 | Fujisaki |
| 4,817,949 A | 4/1989 | Bachman et al. |
| 4,822,985 A | 4/1989 | Boggan et al. |
| 4,831,242 A | 5/1989 | Englehardt |
| 4,831,526 A | 5/1989 | Luchs |
| 4,837,422 A | 6/1989 | Dethloff et al. |
| 4,845,347 A | 7/1989 | McCrindle |
| 4,859,837 A | 8/1989 | Halpern |
| 4,868,376 A | 9/1989 | Lessin et al. |
| 4,870,259 A | 9/1989 | Boggan et al. |
| 4,882,675 A | 11/1989 | Nichtberger et al. |
| 4,897,533 A | 1/1990 | Lyszczarz |
| D305,887 S | 2/1990 | Nishimura |
| 4,906,826 A | 3/1990 | Spencer |
| 4,908,521 A | 3/1990 | Boggan et al. |
| 4,910,672 A | 3/1990 | Off |
| 4,923,288 A | 5/1990 | Allen et al. |
| 4,928,001 A | 5/1990 | Masada |
| 4,941,090 A | 7/1990 | McCarthy |
| 4,943,707 A | 7/1990 | Boggan |
| 4,948,174 A | 8/1990 | Thomson et al. |
| 4,953,085 A | 8/1990 | Atkins |
| 4,954,985 A | 9/1990 | Yamazaki |
| 4,961,142 A | 10/1990 | Elliott et al. |
| 4,968,873 A | 11/1990 | Dethloff et al. |
| 4,975,840 A | 12/1990 | DeTore et al. |
| 4,977,501 A | 12/1990 | Lefevre |
| 4,978,401 A | 12/1990 | Bonomi |
| 4,992,940 A | 2/1991 | Dworkin |
| 5,025,139 A | 6/1991 | Halliburton, Jr. |
| 5,025,372 A | 6/1991 | Burton et al. |
| 5,049,728 A | 9/1991 | Rovin |
| 5,054,096 A | 10/1991 | Beizer |
| 5,055,662 A | 10/1991 | Hasegawa |
| 5,072,380 A | 12/1991 | Randelman et al. |
| 5,080,748 A | 1/1992 | Bonomi |
| 5,095,194 A | 3/1992 | Barbanell |
| 5,097,115 A | 3/1992 | Ogasawara et al. |
| 5,117,355 A | 5/1992 | McCarthy |
| 5,121,945 A | 6/1992 | Thomson et al. |
| 5,146,068 A | 9/1992 | Ugawa et al. |
| 5,175,416 A | 12/1992 | Mansvelt |
| 5,177,342 A | 1/1993 | Adams |
| 5,180,901 A | 1/1993 | Hiramatsu |
| 5,185,697 A | 2/1993 | Jacobs et al. |
| 5,187,750 A | 2/1993 | Behera |
| 5,191,522 A | 3/1993 | Bosco et al. |
| 5,192,947 A | 3/1993 | Neustein |
| 5,201,010 A | 4/1993 | Gabriel et al. |
| 5,202,286 A | 4/1993 | Nakatani |
| 5,202,826 A | 4/1993 | McCarthy |
| 5,206,488 A | 4/1993 | Teicher |
| 5,206,803 A | 4/1993 | Vitagliano |
| 5,214,700 A | 5/1993 | Pinkas et al. |
| 5,218,631 A | 6/1993 | Katz |
| 5,237,620 A | 8/1993 | Deaton |
| 5,247,190 A | 9/1993 | Friend et al. |
| 5,257,486 A | 11/1993 | Holmwall |
| 5,276,311 A | 1/1994 | Hennige |
| 5,287,268 A | 2/1994 | McCarthy |
| 5,287,269 A | 2/1994 | Dorrough et al. |
| 5,297,026 A | 3/1994 | Hoffman |
| 5,311,594 A | 5/1994 | Penzias |
| 5,326,959 A | 7/1994 | Perazza |
| 5,326,960 A | 7/1994 | Tannenbaum |
| 5,328,809 A | 7/1994 | Holmes et al. |
| 5,339,239 A | 8/1994 | Manabe et al. |
| 5,349,633 A | 9/1994 | Katz |
| 5,350,906 A | 9/1994 | Brody et al. |
| 5,351,187 A | 9/1994 | Hassett |
| 5,352,877 A | 10/1994 | Morley |
| 5,359,183 A | 10/1994 | Skodlar |
| 5,361,062 A | 11/1994 | Weiss et al. |
| 5,365,575 A | 11/1994 | Katz |
| 5,382,784 A | 1/1995 | Eberhardt |
| 5,383,113 A | 1/1995 | Knight |
| 5,388,165 A | 2/1995 | Gabriel et al. |
| 5,397,881 A | 3/1995 | Mannik |
| 5,399,502 A | 3/1995 | Friend et al. |
| 5,401,827 A | 3/1995 | Holmes et al. |
| RE34,915 E | 4/1995 | Nichtberger et al. |
| 5,412,190 A | 5/1995 | Kopesec et al. |
| 5,412,192 A | 5/1995 | Hoss |
| 5,413,341 A | 5/1995 | Lieberman |
| 5,424,524 A | 6/1995 | Ruppert et al. |
| 5,444,794 A | 8/1995 | Uhland |
| 5,448,471 A | 9/1995 | Deaton et al. |
| 5,450,477 A | 9/1995 | Amarant et al. |
| 5,453,601 A | 9/1995 | Rosen |
| 5,455,407 A | 10/1995 | Rosen |
| 5,457,305 A | 10/1995 | Akel et al. |
| 5,459,306 A | 10/1995 | Stein et al. |
| 5,465,206 A | 11/1995 | Hilt et al. |
| 5,466,919 A | 11/1995 | Hovakimian |
| 5,471,669 A | 11/1995 | Lidman |
| 5,477,038 A | 12/1995 | Levine et al. |
| 5,477,040 A | 12/1995 | Lalonde |
| 5,479,494 A | 12/1995 | Clitherow |
| 5,481,094 A | 1/1996 | Suda |
| 5,482,139 A | 1/1996 | Rivalto |
| 5,483,444 A | 1/1996 | Heintzeman et al. |
| 5,483,445 A | 1/1996 | Pickering |
| 5,489,123 A | 2/1996 | Roshkoff |
| 5,495,981 A | 3/1996 | Warther |
| 5,500,514 A | 3/1996 | Veeneman et al. |
| 5,500,890 A | 3/1996 | Rogge et al. |
| 5,503,891 A | 4/1996 | Marshall et al. |
| 5,511,114 A | 4/1996 | Stimson et al. |
| 5,512,654 A | 4/1996 | Holmes et al. |
| 5,513,102 A | 4/1996 | Auriemma |
| 5,521,363 A | 5/1996 | Tannenbaum |
| 5,530,232 A | 6/1996 | Taylor |
| 5,530,235 A | 6/1996 | Stefik et al. |
| 5,532,689 A | 7/1996 | Bueno |
| 5,537,314 A | 7/1996 | Kanter |
| 5,541,583 A | 7/1996 | Mandelbaum |
| 5,544,086 A | 8/1996 | Davis et al. |
| 5,544,246 A | 8/1996 | Mandelbaum et al. |
| 5,553,120 A | 9/1996 | Katz |
| 5,577,109 A | 11/1996 | Stimson et al. |
| 5,578,808 A | 11/1996 | Taylor |
| 5,581,064 A | 12/1996 | Riley et al. |
| 5,585,787 A | 12/1996 | Wallerstein |
| 5,590,038 A | 12/1996 | Pitroda |
| 5,592,560 A | 1/1997 | Deaton et al. |
| 5,604,542 A | 2/1997 | Dedrick |
| 5,608,785 A | 3/1997 | Kasday |
| 5,612,868 A | 3/1997 | Off et al. |
| 5,617,474 A | 4/1997 | Ditzig et al. |
| 5,619,558 A | 4/1997 | Jheeta |
| 5,621,787 A | 4/1997 | McKoy et al. |
| 5,621,812 A | 4/1997 | Deaton et al. |
| 5,637,845 A | 6/1997 | Kolls |
| 5,638,457 A | 6/1997 | Deaton et al. |
| 5,642,279 A | 6/1997 | Stone et al. |
| 5,642,485 A | 6/1997 | Deaton et al. |
| 5,644,723 A | 7/1997 | Deaton et al. |
| 5,644,727 A | 7/1997 | Atkins |
| 5,649,114 A | 7/1997 | Deaton et al. |

| Patent | Date | Name |
|---|---|---|
| 5,649,117 A | 7/1997 | Landry |
| 5,649,118 A | 7/1997 | Carlisle et al. |
| 5,650,604 A | 7/1997 | Marcous et al. |
| 5,653,914 A | 8/1997 | Holmes et al. |
| 5,659,469 A | 8/1997 | Deaton et al. |
| 5,659,741 A | 8/1997 | Eberhardt |
| 5,664,110 A | 9/1997 | Green et al. |
| 5,664,157 A | 9/1997 | Takahira et al. |
| 5,665,953 A | 9/1997 | Mazzamuto et al. |
| 5,672,678 A | 9/1997 | Holmes et al. |
| 5,675,607 A | 10/1997 | Alesio et al. |
| 5,675,662 A | 10/1997 | Deaton et al. |
| 5,677,521 A | 10/1997 | Garrou |
| 5,677,955 A | 10/1997 | Doggett et al. |
| 5,680,459 A | 10/1997 | Hook et al. |
| 5,684,291 A | 11/1997 | Taskett |
| 5,687,322 A | 11/1997 | Deaton et al. |
| 5,689,100 A | 11/1997 | Carrithers et al. |
| 5,689,650 A | 11/1997 | McClelland et al. |
| 5,692,132 A | 11/1997 | Hogan |
| 5,696,907 A | 12/1997 | Tom |
| 5,698,837 A | 12/1997 | Furuta |
| 5,699,528 A | 12/1997 | Hogan |
| 5,703,344 A | 12/1997 | Bezy et al. |
| 5,704,046 A | 12/1997 | Hogan |
| 5,705,798 A | 1/1998 | Tarbox |
| 5,708,422 A | 1/1998 | Blonder et al. |
| 5,710,458 A | 1/1998 | Iwasaki |
| 5,710,886 A | 1/1998 | Christensen et al. |
| 5,710,887 A | 1/1998 | Chelliah |
| 5,710,889 A | 1/1998 | Clark et al. |
| 5,715,399 A | 2/1998 | Bezos |
| 5,717,925 A | 2/1998 | Harper et al. |
| 5,721,768 A | 2/1998 | Stimson et al. |
| 5,721,781 A | 2/1998 | Deo et al. |
| 5,726,884 A | 3/1998 | Sturgeon et al. |
| 5,727,153 A | 3/1998 | Powell |
| 5,728,998 A | 3/1998 | Novis et al. |
| 5,729,693 A | 3/1998 | Holda-Fleck |
| 5,734,154 A | 3/1998 | Jachimowicz et al. |
| 5,734,838 A | 3/1998 | Robinson et al. |
| 5,736,728 A | 4/1998 | Matsubara |
| 5,737,421 A | 4/1998 | Audebert |
| 5,740,549 A | 4/1998 | Reilly et al. |
| 5,742,775 A | 4/1998 | King |
| 5,745,049 A | 4/1998 | Akiyama et al. |
| 5,745,706 A | 4/1998 | Wolfberg et al. |
| 5,749,075 A | 5/1998 | Toader et al. |
| 5,760,381 A | 6/1998 | Stich et al. |
| 5,765,138 A | 6/1998 | Aycock et al. |
| 5,765,141 A | 6/1998 | Spector |
| 5,770,843 A | 6/1998 | Rose et al. |
| 5,770,849 A | 6/1998 | Novis et al. |
| 5,774,870 A | 6/1998 | Storey |
| 5,774,882 A | 6/1998 | Keen |
| 5,777,305 A | 7/1998 | Smith et al. |
| 5,777,306 A | 7/1998 | Masuda |
| 5,777,903 A | 7/1998 | Piosenka et al. |
| 5,778,067 A | 7/1998 | Jones et al. |
| 5,787,156 A | 7/1998 | Katz |
| 5,787,404 A | 7/1998 | Fernandez-Holman |
| 5,789,732 A | 8/1998 | McMahon et al. |
| 5,789,733 A | 8/1998 | Jachimowicz et al. |
| 5,790,636 A | 8/1998 | Marshall |
| 5,794,207 A | 8/1998 | Walker |
| 5,796,827 A | 8/1998 | Coppersmith et al. |
| 5,798,950 A | 8/1998 | Fitzgerald |
| 5,799,087 A | 8/1998 | Rosen |
| 5,802,176 A | 9/1998 | Audebert |
| 5,805,719 A | 9/1998 | Pare et al. |
| 5,806,042 A | 9/1998 | Kelly et al. |
| 5,806,044 A | 9/1998 | Powell |
| 5,806,045 A | 9/1998 | Biorge |
| 5,807,627 A | 9/1998 | Friend et al. |
| 5,809,478 A | 9/1998 | Greco |
| 5,814,796 A | 9/1998 | Benson et al. |
| 5,815,657 A | 9/1998 | Williams et al. |
| 5,815,658 A | 9/1998 | Kuriyama |
| 5,819,234 A | 10/1998 | Slavin et al. |
| 5,819,237 A | 10/1998 | Garman |
| 5,826,243 A | 10/1998 | Musmanno et al. |
| 5,832,090 A | 11/1998 | Raspotnik |
| 5,832,457 A | 11/1998 | O'Brien |
| 5,832,488 A | 11/1998 | Eberhardt |
| 5,835,061 A | 11/1998 | Stewart |
| 5,835,576 A | 11/1998 | Katz |
| 5,839,113 A | 11/1998 | Federau et al. |
| 5,845,259 A | 12/1998 | West et al. |
| 5,845,260 A | 12/1998 | Nakano et al. |
| 5,852,811 A | 12/1998 | Atkins |
| 5,852,812 A | 12/1998 | Reeder |
| 5,857,079 A | 1/1999 | Claus et al. |
| 5,857,175 A | 1/1999 | Day |
| 5,857,709 A | 1/1999 | Chock |
| 5,859,419 A | 1/1999 | Wynn |
| 5,864,609 A | 1/1999 | Cross et al. |
| 5,864,828 A | 1/1999 | Atkins |
| 5,864,830 A | 1/1999 | Armetta et al. |
| RE36,116 E | 2/1999 | McCarthy |
| 5,870,718 A | 2/1999 | Spector |
| 5,870,721 A | 2/1999 | Norris |
| 5,875,437 A | 2/1999 | Atkins |
| 5,883,377 A | 3/1999 | Chapin, Jr. |
| 5,883,810 A | 3/1999 | Franklin et al. |
| 5,884,271 A | 3/1999 | Pitroda |
| 5,884,278 A | 3/1999 | Powell |
| 5,884,285 A | 3/1999 | Atkins |
| 5,887,065 A | 3/1999 | Audebert |
| 5,890,138 A | 3/1999 | Godin et al. |
| 5,890,140 A | 3/1999 | Clark et al. |
| H1794 H | 4/1999 | Claus |
| 5,897,620 A | 4/1999 | Walker et al. |
| 5,897,621 A | 4/1999 | Boesch et al. |
| 5,901,303 A | 5/1999 | Chew |
| 5,905,246 A | 5/1999 | Fajkowski |
| 5,907,142 A | 5/1999 | Kelsey |
| 5,907,350 A | 5/1999 | Nemirofsky |
| 5,911,135 A | 6/1999 | Atkins |
| 5,911,136 A | 6/1999 | Atkins |
| 5,914,472 A | 6/1999 | Foladare et al. |
| 5,920,629 A | 7/1999 | Rosen |
| 5,920,844 A | 7/1999 | Hotta et al. |
| 5,920,847 A | 7/1999 | Kolling et al. |
| 5,923,734 A | 7/1999 | Taskett |
| 5,926,800 A | 7/1999 | Baronowski et al. |
| 5,928,082 A | 7/1999 | Clapper, Jr. |
| 5,930,217 A | 7/1999 | Kayanuma |
| 5,931,764 A | 8/1999 | Freeman et al. |
| 5,933,817 A | 8/1999 | Hucal |
| 5,937,068 A | 8/1999 | Audebert |
| 5,940,811 A | 8/1999 | Norris |
| 5,946,669 A | 8/1999 | Polk |
| 5,952,641 A | 9/1999 | Korshun |
| 5,953,423 A | 9/1999 | Rosen |
| 5,953,710 A | 9/1999 | Fleming |
| 5,955,961 A | 9/1999 | Wallerstein |
| 5,956,695 A | 9/1999 | Carrithers et al. |
| 5,963,648 A | 10/1999 | Rosen |
| 5,963,925 A | 10/1999 | Kolling et al. |
| 5,970,478 A | 10/1999 | Walker et al. |
| 5,970,479 A | 10/1999 | Shepherd |
| 5,970,480 A | 10/1999 | Kalina |
| 5,974,399 A | 10/1999 | Giuliani et al. |
| RE36,365 E | 11/1999 | Levine et al. |
| 5,979,757 A | 11/1999 | Tracy |
| 5,984,180 A | 11/1999 | Albrecht |
| 5,984,191 A | 11/1999 | Chapin, Jr. |
| 5,987,434 A | 11/1999 | Libman |
| 5,988,509 A | 11/1999 | Taskett |
| 5,991,413 A | 11/1999 | Arditti et al. |
| 5,991,743 A | 11/1999 | Irving et al. |
| 5,991,748 A | 11/1999 | Taskett |
| 5,991,750 A | 11/1999 | Watson |
| 5,999,596 A | 12/1999 | Walker et al. |
| 6,000,608 A | 12/1999 | Dorf |
| 6,000,832 A | 12/1999 | Franklin et al. |
| 6,002,383 A | 12/1999 | Shimada |
| 6,003,762 A | 12/1999 | Hayashida |

| | | | | | | |
|---|---|---|---|---|---|---|
| 6,004,681 | A | 12/1999 | Epstein et al. | 6,188,309 B1 | 2/2001 | Levine |
| 6,006,988 | A | 12/1999 | Behrmann et al. | 6,189,787 B1 | 2/2001 | Dorf |
| 6,009,415 | A | 12/1999 | Shurling et al. | 6,192,113 B1 | 2/2001 | Lorsch |
| 6,014,636 | A | 1/2000 | Reeder | 6,195,644 B1 | 2/2001 | Bowie |
| 6,014,638 | A | 1/2000 | Burge et al. | 6,202,053 B1 | 3/2001 | Christiansen et al. |
| 6,014,645 | A | 1/2000 | Cunningham | RE37,122 E | 4/2001 | Levine et al. |
| 6,014,749 | A | 1/2000 | Gloor et al. | 6,213,392 B1 | 4/2001 | Zuppichich |
| 6,016,482 | A | 1/2000 | Molinari et al. | 6,222,914 B1 | 4/2001 | McMullin |
| 6,016,954 | A | 1/2000 | Abe et al. | 6,223,143 B1 | 4/2001 | Weinstock et al. |
| 6,019,284 | A | 2/2000 | Freeman et al. | 6,227,447 B1 | 5/2001 | Campisano |
| 6,021,189 | A | 2/2000 | Vu | 6,243,688 B1 | 6/2001 | Kalina |
| 6,026,370 | A | 2/2000 | Jermyn | 6,260,758 B1 | 7/2001 | Blumberg |
| 6,029,139 | A | 2/2000 | Cunningham et al. | 6,263,316 B1 | 7/2001 | Khan et al. |
| 6,029,144 | A | 2/2000 | Barrett et al. | 6,265,977 B1 | 7/2001 | Vega et al. |
| 6,029,890 | A | 2/2000 | Austin | 6,278,981 B1 | 8/2001 | Dembo et al. |
| 6,032,136 | A | 2/2000 | Brake, Jr. et al. | 6,289,322 B1 | 9/2001 | Kitchen et al. |
| 6,032,859 | A | 3/2000 | Muehlberger et al. | 6,292,786 B1 | 9/2001 | Deaton et al. |
| 6,036,099 | A | 3/2000 | Leighton | 6,295,344 B1 | 9/2001 | Marshall |
| 6,038,292 | A | 3/2000 | Thomas | 6,295,522 B1 | 9/2001 | Boesch |
| 6,038,552 | A | 3/2000 | Fleischl et al. | 6,298,336 B1 | 10/2001 | Davis et al. |
| 6,041,315 | A | 3/2000 | Pollin | 6,308,268 B1 | 10/2001 | Audebert |
| 6,044,360 | A | 3/2000 | Picciallo | 6,308,887 B1 | 10/2001 | Korman et al. |
| 6,045,042 | A | 4/2000 | Ohno | 6,315,195 B1 | 11/2001 | Ramachandran |
| 6,047,067 | A | 4/2000 | Rosen | 6,324,524 B1 | 11/2001 | Lent et al. |
| 6,047,268 | A | 4/2000 | Bartoli et al. | 6,324,526 B1 | 11/2001 | D'Agostino |
| 6,048,271 | A | 4/2000 | Barcelou | 6,327,575 B1 | 12/2001 | Katz |
| 6,049,463 | A | 4/2000 | O'Malley et al. | 6,330,543 B1 | 12/2001 | Kepecs |
| 6,049,773 | A | 4/2000 | McCormack et al. | 6,330,546 B1 | 12/2001 | Gopinathan et al. |
| 6,049,782 | A | 4/2000 | Gottesman et al. | 6,336,099 B1 | 1/2002 | Barnett et al. |
| 6,055,573 | A | 4/2000 | Gardenswartz et al. | 6,338,048 B1 | 1/2002 | Mori |
| 6,058,378 | A | 5/2000 | Clark et al. | 6,341,724 B2 | 1/2002 | Campisano |
| 6,061,660 | A | 5/2000 | Eggleston et al. | 6,343,743 B1 | 2/2002 | Lamla |
| 6,064,985 | A | 5/2000 | Anderson | 6,345,261 B1 | 2/2002 | Feidelson |
| 6,065,675 | A | 5/2000 | Teicher | 6,345,766 B1 | 2/2002 | Taskett et al. |
| 6,068,183 | A | 5/2000 | Freeman et al. | 6,349,291 B1 | 2/2002 | Varma |
| 6,070,067 | A | 5/2000 | Nguyen et al. | 6,349,972 B1 | 2/2002 | Geiger et al. |
| 6,070,147 | A | 5/2000 | Harms et al. | 6,360,954 B1 | 3/2002 | Barnardo |
| 6,070,153 | A | 5/2000 | Simpson | 6,366,220 B1 | 4/2002 | Elliott |
| 6,076,068 | A | 6/2000 | DeLapa et al. | 6,366,967 B1 | 4/2002 | Wagner |
| 6,076,072 | A | 6/2000 | Libman | 6,373,969 B1 | 4/2002 | Adler |
| 6,078,888 | A | 6/2000 | Johnson, Jr. | 6,374,230 B1 | 4/2002 | Walker et al. |
| 6,078,891 | A | 6/2000 | Riordan et al. | 6,377,669 B1 | 4/2002 | Walker et al. |
| 6,085,976 | A | 7/2000 | Scher | 6,385,591 B1 | 5/2002 | Mankoff |
| 6,089,284 | A | 7/2000 | Kaehler et al. | 6,385,594 B1 | 5/2002 | Lebda et al. |
| 6,091,817 | A | 7/2000 | Bertina et al. | 6,386,444 B1 | 5/2002 | Sullivan |
| 6,092,056 | A | 7/2000 | Tull, Jr. et al. | 6,397,202 B1 | 5/2002 | Higgins et al. |
| 6,092,057 | A | 7/2000 | Zimmerman et al. | 6,402,039 B1 | 6/2002 | Freeman et al. |
| 6,095,412 | A | 8/2000 | Bertina et al. | 6,405,182 B1 | 6/2002 | Cuervo |
| 6,095,416 | A | 8/2000 | Grant et al. | 6,409,593 B1 | 6/2002 | Petrecca |
| 6,098,053 | A | 8/2000 | Slater | 6,422,459 B1 | 7/2002 | Kawan |
| 6,105,011 | A | 8/2000 | Morrison, Jr. | 6,422,462 B1 | 7/2002 | Cohen |
| 6,105,865 | A | 8/2000 | Hardesty | 6,424,029 B1 | 7/2002 | Giesler |
| 6,109,525 | A | 8/2000 | Blomqvist et al. | 6,429,927 B1 | 8/2002 | Borza |
| 6,112,191 | A | 8/2000 | Burke | 6,434,259 B1 | 8/2002 | Hamid et al. |
| 6,115,458 | A | 9/2000 | Taskett | D462,477 S | 9/2002 | Osborne |
| 6,119,097 | A | 9/2000 | Ibarra | 6,446,210 B1 | 9/2002 | Borza |
| 6,119,103 | A | 9/2000 | Basch et al. | 6,450,407 B1 | 9/2002 | Freeman et al. |
| 6,119,107 | A | 9/2000 | Polk | 6,454,647 B1 | 9/2002 | Woodbury, Jr. |
| 6,119,932 | A | 9/2000 | Maloney et al. | 6,456,981 B1 | 9/2002 | Dejaeger et al. |
| 6,122,623 | A | 9/2000 | Garman | 6,463,039 B1 | 10/2002 | Ricci et al. |
| 6,128,598 | A | 10/2000 | Walker et al. | 6,467,684 B2 | 10/2002 | Fite et al. |
| 6,128,599 | A | 10/2000 | Walker et al. | 6,473,500 B1 | 10/2002 | Risafi et al. |
| 6,129,274 | A | 10/2000 | Suzuki | 6,481,125 B1 | 11/2002 | Pokrasoff |
| 6,129,572 | A | 10/2000 | Feldman et al. | 6,484,144 B2 | 11/2002 | Martin et al. |
| 6,134,309 | A | 10/2000 | Carson | 6,484,146 B2 | 11/2002 | Day et al. |
| 6,134,536 | A | 10/2000 | Shepherd | 6,484,148 B1 | 11/2002 | Boyd |
| 6,138,911 | A | 10/2000 | Fredregill et al. | 6,484,428 B1 | 11/2002 | Greenwald et al. |
| 6,138,917 | A | 10/2000 | Chapin, Jr. | D466,929 S | 12/2002 | Haas |
| 6,145,741 | A | 11/2000 | Wisdom et al. | D467,271 S | 12/2002 | Haas |
| 6,148,297 | A | 11/2000 | Swor et al. | D467,272 S | 12/2002 | Haas |
| 6,161,096 | A | 12/2000 | Bell | 6,490,568 B1 | 12/2002 | Omara et al. |
| 6,163,770 | A | 12/2000 | Gamble et al. | 6,498,861 B1 | 12/2002 | Hamid et al. |
| 6,164,533 | A | 12/2000 | Barton | D468,789 S | 1/2003 | Arnold et al. |
| 6,167,385 | A | 12/2000 | Hartley-Urquhart | 6,505,095 B1 | 1/2003 | Kolls |
| 6,169,975 | B1 | 1/2001 | White et al. | 6,505,168 B1 | 1/2003 | Rothman et al. |
| 6,173,267 | B1 | 1/2001 | Cairns | 6,505,780 B1 | 1/2003 | Yassin et al. |
| 6,182,048 | B1 | 1/2001 | Osborn et al. | 6,529,880 B1 | 3/2003 | McKeen et al. |
| 6,182,894 | B1 | 2/2001 | Hackett et al. | 6,553,113 B1 | 4/2003 | Dhir et al. |
| 6,186,793 | B1 | 2/2001 | Brubaker | 6,557,039 B1 | 4/2003 | Leong et al. |

| | | |
|---|---|---|
| D474,235 S | 5/2003 | Haas |
| 6,557,750 B1 | 5/2003 | Druse et al. |
| 6,557,766 B1 | 5/2003 | Leighton |
| 6,560,578 B2 | 5/2003 | Eldering |
| 6,560,581 B1 | 5/2003 | Fox et al. |
| 6,561,657 B1 | 5/2003 | Schofield |
| 6,567,786 B1 | 5/2003 | Bibelnieks et al. |
| 6,567,821 B1 | 5/2003 | Polk |
| 6,574,603 B1 | 6/2003 | Dickson et al. |
| 6,581,839 B1 | 6/2003 | Lasch et al. |
| D476,681 S | 7/2003 | Al Amri |
| D477,359 S | 7/2003 | Haas |
| 6,592,044 B1 | 7/2003 | Wong et al. |
| 6,601,040 B1 | 7/2003 | Kolls |
| 6,601,761 B1 | 8/2003 | Katis |
| 6,607,127 B2 | 8/2003 | Wong |
| 6,609,111 B1 | 8/2003 | Bell |
| 6,609,113 B1 | 8/2003 | O'Leary et al. |
| 6,609,654 B1 | 8/2003 | Anderson et al. |
| 6,609,658 B1 | 8/2003 | Sehr |
| RE38,255 E | 9/2003 | Levine et al. |
| 6,615,189 B1 | 9/2003 | Phillips et al. |
| 6,615,190 B1 | 9/2003 | Slater |
| 6,625,582 B2 | 9/2003 | Richman et al. |
| 6,631,849 B2 | 10/2003 | Blossom |
| 6,641,049 B2 | 11/2003 | Luu |
| 6,641,050 B2 | 11/2003 | Kelley et al. |
| 6,671,673 B1 | 12/2003 | Baseman et al. |
| D485,573 S | 1/2004 | Li |
| 6,675,127 B2 | 1/2004 | LaBlanc et al. |
| 6,675,149 B1 | 1/2004 | Ruffin et al. |
| 6,693,544 B1 | 2/2004 | Hebbecker |
| 6,732,919 B2 | 5/2004 | Macklin et al. |
| D490,840 S | 6/2004 | Arakaki et al. |
| D491,186 S | 6/2004 | Arakaki et al. |
| D491,953 S | 6/2004 | Arakaki et al. |
| 6,742,704 B2 | 6/2004 | Fitzmaurice et al. |
| 6,745,938 B2 | 6/2004 | Sullivan |
| 6,757,660 B2 | 6/2004 | Canada et al. |
| 6,757,710 B2 | 6/2004 | Reed |
| D495,736 S | 9/2004 | Scharf |
| D496,365 S | 9/2004 | Liu et al. |
| 6,793,135 B1 | 9/2004 | Ryoo |
| 6,802,008 B1 | 10/2004 | Ikefuji et al. |
| 6,805,287 B2 | 10/2004 | Bishop |
| 6,805,288 B2 | 10/2004 | Routhenstein et al. |
| D498,236 S | 11/2004 | Liu et al. |
| 6,856,973 B1 | 2/2005 | Bott |
| 6,865,547 B1 | 3/2005 | Brake, Jr. et al. |
| 6,868,426 B1 | 3/2005 | Mankoff |
| 6,876,971 B1 | 4/2005 | Burke |
| D505,450 S | 5/2005 | Lauer et al. |
| 6,895,383 B2 | 5/2005 | Heinrich |
| 6,895,386 B1 | 5/2005 | Bachman et al. |
| 6,901,372 B1 | 5/2005 | Helzerman |
| 6,912,502 B1 | 6/2005 | Buddle et al. |
| 6,942,569 B2 | 9/2005 | Petracca |
| 6,945,453 B1 | 9/2005 | Schwarz Jr. |
| 6,961,710 B1 | 11/2005 | Yanagisawa et al. |
| 6,970,830 B1 | 11/2005 | Samra et al. |
| 6,978,369 B2 | 12/2005 | Wheeler et al. |
| 6,999,943 B1 | 2/2006 | Johnson et al. |
| 7,006,992 B1 | 2/2006 | Packwood |
| 7,014,110 B2 | 3/2006 | Minowa et al. |
| 7,025,256 B1 | 4/2006 | Drummond et al. |
| 7,039,600 B1 * | 5/2006 | Meek et al. ............... 705/14.36 |
| 7,051,925 B2 | 5/2006 | Schwarz, Jr. |
| 7,072,864 B2 | 7/2006 | Brake, Jr. et al. |
| 7,072,909 B2 | 7/2006 | Polk |
| 7,076,465 B1 | 7/2006 | Blagg et al. |
| 7,089,503 B1 | 8/2006 | Bloomquist et al. |
| 7,092,905 B2 | 8/2006 | Behrenbrinker et al. |
| 7,092,916 B2 | 8/2006 | Diveley |
| 7,104,443 B1 | 9/2006 | Paul et al. |
| 7,107,249 B2 | 9/2006 | Dively |
| 7,113,914 B1 | 9/2006 | Spielmann et al. |
| D533,220 S | 12/2006 | Graves et al. |
| 7,163,153 B2 | 1/2007 | Blossom |
| 7,165,049 B2 | 1/2007 | Slater |
| D538,349 S | 3/2007 | Hollands |
| 7,191,952 B2 | 3/2007 | Blossom |
| 7,216,091 B1 | 5/2007 | Blandina et al. |
| 7,225,155 B1 | 5/2007 | Polk |
| 7,243,839 B2 | 7/2007 | Beck et al. |
| 7,249,092 B2 | 7/2007 | Dunn et al. |
| 7,249,112 B2 | 7/2007 | Berardi et al. |
| 7,252,223 B2 | 8/2007 | Schofield |
| D551,705 S | 9/2007 | Mershon |
| 7,295,999 B1 | 11/2007 | Simon et al. |
| 7,306,141 B1 | 12/2007 | Schwarz, Jr. |
| 7,311,244 B1 | 12/2007 | Schwarz, Jr. |
| 7,312,707 B1 | 12/2007 | Bishop et al. |
| 7,315,843 B2 | 1/2008 | Diveley et al. |
| 7,346,567 B2 | 3/2008 | Weeks |
| 7,349,866 B2 | 3/2008 | Schwarz, Jr. |
| 7,357,331 B2 | 4/2008 | Blossom |
| 7,392,222 B1 | 6/2008 | Hamilton et al. |
| 7,392,224 B1 | 6/2008 | Bauer et al. |
| 7,421,410 B1 | 9/2008 | Schechtman et al. |
| 7,493,288 B2 | 2/2009 | Biship et al. |
| 7,591,416 B2 | 9/2009 | Blossom |
| 7,753,259 B1 | 7/2010 | Taylor et al. |
| 7,784,682 B2 | 8/2010 | Taylor et al. |
| 7,822,684 B2 | 10/2010 | Rielly et al. |
| 7,926,711 B2 | 4/2011 | Taylor et al. |
| 2001/0011227 A1 | 8/2001 | Ashery et al. |
| 2001/0011243 A1 | 8/2001 | Dembo et al. |
| 2001/0027389 A1 | 10/2001 | Beverina et al. |
| 2001/0027441 A1 | 10/2001 | Wankmueller |
| 2001/0034647 A1 | 10/2001 | Marks et al. |
| 2001/0034682 A1 | 10/2001 | Knight et al. |
| 2001/0037300 A1 * | 11/2001 | Miyazaki et al. ............... 705/43 |
| 2001/0037315 A1 | 11/2001 | Saliba et al. |
| 2001/0044293 A1 | 11/2001 | Morgan |
| 2001/0047332 A1 | 11/2001 | Gonen-Friedman et al. |
| 2001/0047342 A1 | 11/2001 | Cuervo |
| 2001/0051917 A1 | 12/2001 | Bissonette et al. |
| 2001/0054003 A1 * | 12/2001 | Chien et al. ............... 705/14 |
| 2001/0056398 A1 | 12/2001 | Scheirer |
| 2002/0019793 A1 | 2/2002 | Frattalone |
| 2002/0019803 A1 | 2/2002 | Muller |
| 2002/0026418 A1 | 2/2002 | Koppel et al. |
| 2002/0032609 A1 | 3/2002 | Wilkman |
| 2002/0040312 A1 | 4/2002 | Dhar et al. |
| 2002/0046089 A1 | 4/2002 | Zorn |
| 2002/0046255 A1 | 4/2002 | Moore et al. |
| 2002/0059139 A1 | 5/2002 | Evans |
| 2002/0062235 A1 | 5/2002 | Wahlbin et al. |
| 2002/0065720 A1 | 5/2002 | Carswell et al. |
| 2002/0077964 A1 | 6/2002 | Brody et al. |
| 2002/0077978 A1 | 6/2002 | O'Leary et al. |
| 2002/0082990 A1 | 6/2002 | Jones |
| 2002/0091572 A1 | 7/2002 | Anderson et al. |
| 2002/0091631 A1 | 7/2002 | Usui |
| 2002/0095365 A1 | 7/2002 | Slavin et al. |
| 2002/0099586 A1 | 7/2002 | Bladen et al. |
| 2002/0104878 A1 | 8/2002 | Seifert et al. |
| 2002/0111916 A1 | 8/2002 | Coronna et al. |
| 2002/0116271 A1 | 8/2002 | Mankoff |
| 2002/0116330 A1 | 8/2002 | Hed et al. |
| 2002/0117541 A1 | 8/2002 | Biggar et al. |
| 2002/0120627 A1 | 8/2002 | Mankoff |
| 2002/0120642 A1 | 8/2002 | Fetherston |
| 2002/0129221 A1 | 9/2002 | Borgia et al. |
| 2002/0133461 A1 | 9/2002 | Ramachandran |
| 2002/0138418 A1 | 9/2002 | Zarin et al. |
| 2002/0143703 A1 | 10/2002 | Razvan et al. |
| 2002/0145039 A1 | 10/2002 | Carroll |
| 2002/0147662 A1 | 10/2002 | Anderson |
| 2002/0156723 A1 | 10/2002 | Lilly et al. |
| 2002/0165771 A1 | 11/2002 | Walker et al. |
| 2002/0165820 A1 | 11/2002 | Anvekar et al. |
| 2002/0169719 A1 | 11/2002 | Dively et al. |
| 2002/0174016 A1 | 11/2002 | Cuervo |
| 2002/0174018 A1 | 11/2002 | Bunger et al. |
| 2002/0178025 A1 | 11/2002 | Hansen et al. |
| 2002/0194081 A1 | 12/2002 | Perkowski |
| 2003/0004828 A1 | 1/2003 | Epstein |

| | | | | | |
|---|---|---|---|---|---|
| 2003/0018613 A1 | 1/2003 | Oytac | 2005/0171898 A1 | 8/2005 | Bishop et al. |
| 2003/0023549 A1 | 1/2003 | Armes et al. | 2005/0179251 A1 | 8/2005 | Wagoner et al. |
| 2003/0028483 A1 | 2/2003 | Sanders et al. | 2005/0189427 A1 | 9/2005 | Brown et al. |
| 2003/0028518 A1 | 2/2003 | Mankoff | 2005/0199705 A1 | 9/2005 | Beck et al. |
| 2003/0033211 A1 | 2/2003 | Haines et al. | 2005/0216888 A1 | 9/2005 | Drummond et al. |
| 2003/0033246 A1 | 2/2003 | Slater | 2005/0234771 A1 | 10/2005 | Register et al. |
| 2003/0034388 A1 | 2/2003 | Routhenstein et al. | 2005/0269396 A1 | 12/2005 | Schofield |
| 2003/0040927 A1 | 2/2003 | Sato et al. | 2006/0026092 A1 | 2/2006 | Klein et al. |
| 2003/0040959 A1 | 2/2003 | Fei et al. | 2006/0036553 A1 | 2/2006 | Gupta et al. |
| 2003/0046249 A1 | 3/2003 | Wu | 2006/0038004 A1* | 2/2006 | Rielly et al. ............... 235/379 |
| 2003/0053609 A1 | 3/2003 | Risafi et al. | 2006/0039733 A1 | 2/2006 | Meyerhofer |
| 2003/0061157 A1 | 3/2003 | Hirka et al. | 2006/0041540 A1 | 2/2006 | Shannon et al. |
| 2003/0074290 A1 | 4/2003 | Clore | 2006/0047573 A1* | 3/2006 | Mitchell et al. ............... 705/14 |
| 2003/0101119 A1 | 5/2003 | Persons et al. | 2006/0047589 A1 | 3/2006 | Grau |
| 2003/0105672 A1 | 6/2003 | Epstein et al. | 2006/0074794 A1 | 4/2006 | Nespola, Jr. |
| 2003/0105714 A1 | 6/2003 | Alarcon Luther et al. | 2006/0085334 A1 | 4/2006 | Murphy |
| 2003/0110111 A1 | 6/2003 | Nalebuff et al. | 2006/0106696 A1 | 5/2006 | Carlson |
| 2003/0140004 A1 | 7/2003 | O'Leary et al. | 2006/0116903 A1 | 6/2006 | Becerra |
| 2003/0144935 A1 | 7/2003 | Sobek | 2006/0122918 A1 | 6/2006 | Graboske et al. |
| 2003/0154125 A1 | 8/2003 | Mittal et al. | 2006/0131869 A1 | 6/2006 | Brignull |
| 2003/0163403 A1 | 8/2003 | Chen et al. | 2006/0224480 A1 | 10/2006 | Bent et al. |
| 2003/0163416 A1 | 8/2003 | Kitajima | 2006/0242057 A1 | 10/2006 | Velarde |
| 2003/0167218 A1 | 9/2003 | Field et al. | 2006/0251478 A1 | 11/2006 | Desmeules |
| 2003/0172040 A1 | 9/2003 | Kemper et al. | 2006/0259364 A1 | 11/2006 | Strock et al. |
| 2003/0187787 A1 | 10/2003 | Freund | 2007/0078719 A1 | 4/2007 | Schmitt et al. |
| 2003/0195808 A1 | 10/2003 | Brown et al. | 2007/0156530 A1 | 7/2007 | Schmitt et al. |
| 2003/0200143 A9 | 10/2003 | Walker et al. | 2007/0162388 A1* | 7/2007 | Hamilton et al. ............... 705/43 |
| 2003/0200180 A1 | 10/2003 | Phelan et al. | 2007/0265924 A1 | 11/2007 | Schwarz |
| 2003/0204421 A1 | 10/2003 | Houle et al. | 2008/0010202 A1 | 1/2008 | Schwarz |
| 2003/0213843 A1 | 11/2003 | Jackson | 2008/0177659 A1 | 7/2008 | Lacey et al. |
| 2003/0216965 A1 | 11/2003 | Libman | 2009/0043651 A1 | 2/2009 | Schwarz |
| 2003/0217005 A1 | 11/2003 | Drummond et al. | 2009/0150370 A1 | 6/2009 | Christensen et al. |
| 2003/0217329 A1 | 11/2003 | Good | 2009/0313106 A1 | 12/2009 | Taylor et al. |
| 2003/0229525 A1 | 12/2003 | Callahan et al. | 2010/0332388 A1 | 12/2010 | Rielly et al. |
| 2004/0024672 A1 | 2/2004 | Brake, Jr. et al. | | | |
| 2004/0029569 A1 | 2/2004 | Khan et al. | | | |

FOREIGN PATENT DOCUMENTS

| | | |
|---|---|---|
| EP | 0855659 | 7/1998 |
| EP | 959440 | 11/1999 |
| GB | 2275654 A | 9/1994 |
| GB | 2376787 | 12/2002 |
| GB | 2377071 | 12/2002 |
| GB | 2377314 | 1/2003 |
| WO | WO 94/29112 | 12/1994 |
| WO | WO 97/41673 | 11/1997 |
| WO | WO 98/59307 | 12/1998 |
| WO | WO 99/05633 | 2/1999 |
| WO | WO 99/54841 | 10/1999 |
| WO | WO 01/18699 | 3/2001 |
| WO | WO 01/69347 | 9/2001 |
| WO | WO 01/69347 A2 | 9/2001 |
| WO | WO 01/69347 A3 | 9/2001 |
| WO | WO 2005/043277 | 5/2005 |
| WO | WO 2008/021381 | 2/2008 |
| WO | WO 2008/021382 | 2/2008 |

| | | |
|---|---|---|
| 2004/0030626 A1 | 2/2004 | Libman |
| 2004/0039588 A1 | 2/2004 | Libman |
| 2004/0049452 A1 | 3/2004 | Blagg |
| 2004/0059952 A1 | 3/2004 | Newport et al. |
| 2004/0064402 A1 | 4/2004 | Dreyer et al. |
| 2004/0093296 A1 | 5/2004 | Phelan et al. |
| 2004/0093303 A1 | 5/2004 | Picciallo |
| 2004/0094624 A1 | 5/2004 | Fernandes et al. |
| 2004/0098351 A1 | 5/2004 | Duke |
| 2004/0103431 A1 | 5/2004 | Davenport et al. |
| 2004/0118914 A1 | 6/2004 | Smith et al. |
| 2004/0128186 A1 | 7/2004 | Breslin et al. |
| 2004/0128195 A1 | 7/2004 | Sorem |
| 2004/0149544 A1 | 8/2004 | Dal Ferro et al. |
| 2004/0159700 A1 | 8/2004 | Khan et al. |
| 2004/0193539 A1 | 9/2004 | Sullivan |
| 2004/0215507 A1 | 10/2004 | Levitt et al. |
| 2004/0232223 A1 | 11/2004 | Beenau et al. |
| 2004/0239481 A1 | 12/2004 | Beenau et al. |
| 2004/0242308 A1 | 12/2004 | Gray |
| 2004/0243498 A1 | 12/2004 | Duke |
| 2004/0252012 A1 | 12/2004 | Beenau et al. |
| 2005/0021353 A1 | 1/2005 | Aviles et al. |
| 2005/0021400 A1 | 1/2005 | Postrel |
| 2005/0021401 A1* | 1/2005 | Postrel ............... 705/14 |
| 2005/0021457 A1 | 1/2005 | Johnson et al. |
| 2005/0027649 A1 | 2/2005 | Cech |
| 2005/0033619 A1 | 2/2005 | Barnes et al. |
| 2005/0035192 A1 | 2/2005 | Bonalle et al. |
| 2005/0035847 A1 | 2/2005 | Bonalle et al. |
| 2005/0040242 A1 | 2/2005 | Beenau et al. |
| 2005/0049950 A1 | 3/2005 | Johnson |
| 2005/0065877 A1 | 3/2005 | Cleary et al. |
| 2005/0071230 A1 | 3/2005 | Mankoff |
| 2005/0075932 A1 | 4/2005 | Mankoff |
| 2005/0077350 A1 | 4/2005 | Courtion et al. |
| 2005/0086160 A1 | 4/2005 | Wong et al. |
| 2005/0091138 A1 | 4/2005 | Awatsu |
| 2005/0102228 A1 | 5/2005 | Srinivasan et al. |
| 2005/0108152 A1 | 5/2005 | Tsoa-Lee et al. |
| 2005/0114883 A1 | 5/2005 | Nagai et al. |
| 2005/0119979 A1 | 6/2005 | Murashita et al. |
| 2005/0167488 A1 | 8/2005 | Higgins et al. |

OTHER PUBLICATIONS

Song, A Card That Asks for ID, TIme Magazine, Apr. 12, 2004, 1 page.
A Store Card Issuer Looks for Lift from Electronic Gift Certificates, Credit Card News, Feb. 1, 1995, 2 pages.
Claessens, et al., A Tangled World Wide Web of Security Issues, First Monday, retrieved from the internet at http//www.firstmonday.org/issues/issue7_3/claessens, retrieved from the internet on Oct. 6, 2006.
Hotchkiss, ATM's at the head of their class, Bank Marketing, vol. 29, No. 3, Mar. 1997, pp. 26-32.
Edwards, ATMs The Hot New Media Buy, ABA Banking Journal, Mar. 1999, pp. 58, 60.
Abstract to 2007 JPMorgan Chase Disaster Response Card National Strategy Plan Abstract.
Siegel, Joel G., Et. Al., Accounting Handbook, Mar. 1999.
Alaska Housing Finance Corporation, Request for Information Banking Services, Quarterly Unaudited Financial Statements, Mar. 31, 2005 (89 pages) JPMC-ACS-00000143-231.
Allen et al., Allen et al., Overview of Smart Cards and the Industry, Smart Cards Seizing Strategic Business Opportunities, Chapter 1, pp. 2-20, Irwin Professional Publishing, 1997.

American Banker Inc., American Banker, Inc., NCNB to Become Biggest Bank in Visa Debit Card Program, The American Banker, Mar. 8, 1979.
American Bankers Association, American Bankers Association, The Bank Credit Card Business, 1996.
American Express Incentive Services, Incentive, Sep. 1996, p. 126.
None, American Express and Starwood Launch the New Starwood Preferred Guest (SM) Credit Card from American Express, Jun. 19, 2001, PR Newswire, p. 1.
Fickenscher, Amex Prepaid Offering is Latest Card for Firms Regarding Employees, American Banker, vol. 161, No. 151, Aug. 8, 1996, pp. 1-2.
Neumann, An Enhanced Neural Network Technique for Software Risk Analysis, IEEE Transactions on Software Engineering, vol. 28, No. 9, Sep. 1, 2002, pp. 904-912.
Anonymous, Anonymous, Association of Inventive Gift Certificate Suppliers, Incentive, vol. 169, No. 8, pp. SS1-SS23, Aug. 1995.
The State of Arkansas, Arkansas Code of 1987 Annotated.
Associates First Capital Corporation, Hoover's Inc., The Industry Standard the Newsmagazine of the Internet Economy, thestandard.net/companies/company-display, Apr. 6, 1999.
Authorization of Financial Agent and Terms of Performance, Debit Card Application for Houston, Texas, Sep. 1991, acs00277412.
E-LOAN, Auto Loan Rates, 1997.
Award Card Comparison, JA7922 (date unknown).
Plotnick, Jennifer, Bakersfield Calif Investors Explore Buying Rental Property Apr. 11, 2004.
Brehl, Banks issue cash-card pledge, The Toronto Star, Oct. 9, 1997, 1 page.
Block, Valerie, Blockbuster running test of a stored value card, The American Banker, Sep. 1, 1995.
Board of Governors of the Federal Reserve System—Report to the Congress on the Application of the Electronic Fund Transfer Act to Electronic Stored-Value Products, May 1997, acs00098020.
Meece, Boatman's Prepaid Cards for Worker-Incentive Firm, American Banker, Jul. 2, 1996, p. 12.
Boatmen's Floats Stored Value into the Employee Incentive Waters, Debit Card News, vol. 2, Issue 2, Jul. 16, 1996, 3 pages.
Business Editors and Real Estate Writers, Business Editors and Real Estate Automotive Writers, Consumers Now Can Know What Loan Rate Offers to Expect Based on Their FICO Credit Score at MyFICO.com, Business Wire, New York, Mar. 6, 2002, p. 1.
Business Wire, Business Wire, Inc., Associates-Corp/AMOCO—Announce Plans to Offer Free Visa and MasterCard Accounts, Business Wire, Aug. 29, 1985.
CES/NaBANCO introduces stored value card technology blockbuster video is first merchant partner, Business Wire, Inc., Jan. 15, 1996.
Cheney, How Effective Were the Financial Saftey Nets in the Aftermath of Katrina, HurricaneKatrinaJan06, Jan. 2006.
Card Based Award Systems, JA8309 (date unknown).
CardEx Incentives, www.cardex.com, Apr. 6, 1999.
CardTrak Online, Coca-Cola ATM Money Cards (Apr. 4, 1997) Web page at http://www.cardweb.com/cardtrak/news/cf_4a_97.html printed Apr. 7, 2009 ACS 012.
CARDWEB.COM Inc., CardWeb.com, Inc., Passwords for Today's CardFlash Online, CardFlash, Apr. 5, 2005.
Vandenengel, Cards on the Internet Advertising on a $3 Bill, Industry Intelligence, Feb. 1, 1995, pp. 46-48.
Kutler, Cash Card Creator Looking Beyond Mondex, Feb. 9, 1995.
Rosen, Cash Just Isn't Flexible Enough Shops of the Future Will Only Take Cards, Daily Express, Technology Section, Feb. 10, 1995, 1 page.
BANK, Cash, Check,Charge—What's Next?, Seattle Times, Mar. 6, 1995.
Morgan et al., Categorizing Risks for Risk Ranking, vol. 20, No. 1, Jun. 22, 2005, pp. 49-58.
Common electronic purse specifications, Business Requirements, Version 6.0, Dec. 1998.
Guidotti, Comparing Environmental risks a Consultative Approach to Setting Priorities at the Community Level, Public Health Rev 1994, vol. 22, Jun. 16, 2005, pp. 321-337.
Britt, Competing in Auto Lending, America's Community Banker, vol. 5, No. 11, Nov. 1, 1996, pp. 33-37.
Haddad, Charles, et. al., Congratulations, Grads —You're Bankrupt a Marketing Blitz Buries Kids in Plastic and Debt, May 1999.
Consortium created to manage common electronic purse specification, Cardtech Securtech, Chicago, www.visa.com/av/news/PRmisc051199.vhtml, May 11, 1999.
Hight, Jim, Consulting Services, www.strategies-tactics.com, Dec. 1998.
Nora Wood, Corporate Spotlight, Incentive, Dec. 1997, 4 pages.
Mobasher et al., Creating Adaptive Web Sites Through Usage-Based Clustering of URLs, Knowledge and Data Engineering Exchange Workshop, Chicago, IL and Los Alamitos, CA, 1999, pp. 19-25.
Lamond, Credit Card Transactions Real World and Online, Paying by Credit Card-Real World and Online, http//www.virtualschool.edu/mon/ElectronicProperty/klamond/credit, printed Jul. 8, 2005, 17 pages.
D.C. Area Safeway Stores Look for Increase in Sales Volume and Revenue with Cards, Card News, vol. 6, No. 25, Dec. 30, 1991, pp. 7-9.
Davis, Donald, Davis, D., Merchants Unbound, Card Technology, Jun. 2004, vol. 9, No. 7, p. 36 (8 pages).
CARDWEB.COM, Daily Payment Card News, 1997.
Sherer, Paul M., Deals & Deal Makers Web Ventures Seek to Facilitate Business Credit, Private Equity, 1995.
Debit Card News—Paperless Trail Leads Debit to a Check-Free Payroll Program, vol. 3, No. 12, Dec. 16, 1997.
Debit Card Services—Invitation for Expressions of Interest, Jul. 1991, acs00277422.
Piskora, Debit Cards Seen Poised for New Markets, American Banker, Credit/Debit/ATMs, Mar. 7, 1995, p. 16.
Debit and Stored Value Cards for Government: A Growing Trend but States Could Do More, A Survey and White paper of the EBT Industry Council, Nov. 2006.
Definition of Store-Value Card, Wikipedia, retrieved from the internet at http//en.wikipedia.org/wiki/Stored-value_card, retrieved from the internet on Apr. 16, 2007.
PR NEWSWIRE, Delta and American Express Introduce, Always Double Miles Feature on Delta SkyMiles® Cards, Oct. 2, 2000, PR Newswire, p. 1.
Direct Payment Card, International EBT Pilot Evaluation Pilot Evaluation—Argentina, Jan. 1996, acs00277456.
Lennox, Graeme, Don't Be Tempted by the Urge to Splurge Zero Rates Sound Great But You'll Pay Dearly in the End, 2001.
E-LOAN, A Better Way to Get a Loan—Frequently Asked Questions (FAQ), Apr. 7, 2001, eloan.com (web.archive.org/web/20010407063242/www.wheels.eloan.com/cgibin/show/auto fa...).
E-LOAN, A Better Way to Get a Loan, AutoLoan webpage, Apr. 4, 2001, eloan.com (web.archive.org/web20010404223234/www.wheels.eloan.com/cgibin/autoloans?).
E-Z Pass, E-ZPass Discount Plans . . . You Save Money, Too! Web page at http: \\www.ezpass.com-frameMain.html, Nov. 12, 2001.
E-Z Pass, E-ZPass Enrollment Discount Plans, Web page at http://www.ezpass.com-Disc_ny_annual.html, Nov. 12, 2001.
E-Z Pass, Standard Automatic Discount Programs, Web page at http://www.ezpass.com-Disc_portNewYork.html, Nov. 12, 2001.
E-Z Pass, What is E-ZPass? Web page at http://www.ezpass.com-whatis.html, Nov. 12, 2001.
Eight Keys to Making the Right Choice, Incentive, Dec. 1996, 9 pages.
D. O'Mahony, Electronic Payment System, 1997, Artech House, XP002137255, p. 7-11.
Business Times, Electronic Purse Can Free You from ATM Drag, Business Times, www.btimes.co.za, printed Feb. 23, 2001, 1 page.
Electronic Purse, SCIA (Smart Card Industry Association), About Smart Cards, www.scia.org, printed Feb. 23, 2001, 1 page.
Sanchez-Klein, Electronic purse affiance planned, Computerworld Online News, Jul. 29, 1998, printed Feb. 23, 2001, 2 pages.
Electronic purse card to be launched tomorrow, New Straits Times, News Clippings, Sep. 18, 1999, printed Feb. 23, 2001, 3 pages.
Exclusively Yours From Maritz . . . The MasterCard Card Ultimate Incentive, Incentive, Oct. 1995, 3 pages.

FOIA # Sep. 2, 2012 Responsive Records Book #11, Mar. 12, 2009, acs00279715.
FOIA # Sep. 2, 2012 Responsive Records Book #2, Mar. 12, 2009, acs00277515.
FOIA # Sep. 2, 2012 Responsive Records Book #3, Mar. 12, 2009, acs00277531.
FOIA # Sep. 2, 2012 Responsive Records Book #5, Mar. 12, 2009, acs00278229.
FOIA # Sep. 2, 2012 Responsive Records Book #7, Mar. 12, 2009, acs00278754.
Block, First Data Subsidiary Creates Payroll Card for the Bankless, LexisNexis Academic, Credit/Debit/ATMs, p. 10, Mar. 21, 1997.
First Data markets stored-value cards, Cards International, Jan. 30, 1996, p. 5.
First USA—Activate Today and Get One Hour Free Calling Card Calls, First USA, 6 pages, 1997.
First USA—Call to Receive One Free Hour of Domestic Long Distance Calling (No Strings Attached), First USA, 6 pages, 1997.
First USA Platinum Connect, First USA Bank, First USA Promotional Mailing, Oct. 1997, 6 pages.
First Union Issues Smart Cards to Fort Benning Recruits, CardFax, vol. 1999, No. 60, Mar. 26, 1999, 1 page.
Norris, First data unit develops blockbuster cash card, Omaha World Hearld Sunrise Edition, Business Section, Jan. 19, 1996, p. 16.
Roberts, Leigh, Fnb and Nedcor Launch Into the New Era of Smart Card Banking Nov. 15, 1998.
E-LOAN, Frequently Asked Questions, 1998.
Frequently asked questions, ECARD, www.eregard.com, printed Sep. 23, 2001, 7 pages.
Glossman, et al.,, Glossman, et al., Citicorp Company Report, Report No. 1647151, p. 8 of 16, 2001.
Ostroff, Jeff, Guide to Buying New Cars, Used Cars, Dealer Scams, 2001.
Hamey, Kenneth, Hamey, Home Asset Management Accounts Link Mortgages Equity Lines [Final Edition], The Washington Post, Oct. 5, 2002.
Hargreaves, The Evaluation of the Expanded EBT Demonstration in Maryland, Final Report, May 1994, acs00092018.
Machlis, Have it the smart way Burger King program drives smartcard use, Computerworld, printed Feb. 23, 2001, 1 page.
Here's the calling convenience you asked for 1-800-call-ATT . . . For All Calls, AT&T, Appendix A for Card Carriers, 1999, 7 pages.
Hoovers, General Mills, Inc. Corporate Profile relied upon to show the history of the company, http//cobrands.hoovers.com/global/cobrands/proquest/history.xhtml?COID=10639, Jul. 12, 2005, 2 pages.
How Is It Different?, JA8331 (date unknown).
Konrad, IBM Had a Bunch of Unusual Ideas in 2003, www.philly.com, printed Jan. 21, 2004, posted on Jan. 13, 2004, 2 pages.
Incenticard, Bellsouth, JA8329 (date unknown).
Judy Quinn, Incentive Cards Explained, Incentive, Dec. 1995, 5 pages.
Incentive Firms Find Debit Cards a Rewarding Experience, Debit Card News, vol. 3, No. 11, Nov. 28, 1997.
Vincent Alonzo, Incentive Marketing . . . Three If by Smart Card, Incentive Sep. 1995, p. 11.
Incentive gift Card Another way to give the gift of choice!, Incentive, Aug. 1995, 2 pages.
Coulton, Incentives Field Moving to Card-Based Series 14, American Banker, Mar. 26, 1998, 3 pages.
Introducing SpendingMoney(TM), Armetta Marketing & Design Product Concept Report, Oct. 9, 1996, 15 pages.
Introducing the First USA Platinum Connect Card, First USA Promotional Mailing, Dec. 1997, 2 pages.
JPMorgan Chase, In Time of Need: A National Strategy for Disaster Response Cards, Treasury Services-Public Sector, Jan. 26, 2007.
Kibble-Smith, Brian, Kibble-Smith, House Committee on Ways and Means, Statement of Brian Kibble-Smith, JPMorgan Chase Treasury Services, Apr. 5, 2006.
Kiley, Kathleen, Kiley, Branded!, Catalog Age, Jun. 1996, vol. 3, No. 6, p. 77 (4 pages).
Kilian-Kehr, Roger, Kilian-Kehr, Mobile Security with Smartcards, Dissertation, Apr. 8, 2002.
Key Bank Holiday Offer, http//www.key.com/swiftgift/home.html, printed Apr. 5, 1999.
Kleege, Stephen, Kleege, Visa Unveils CoBranding Offensive (Visa International, Visa U.S.A. Inc.), American Banker, v. 159, n. 43, Mar. 4, 1994 (www.dialogclassic.com/MainFrame.jsp, pp. 1-3).
Lewis, David, Lewis, Mortgage Lending Optimized, IntternetWeek, Issue 858, Apr. 23, 2001.
LexisNexis Academic, Debit Card Innovation, vol. XXXV, No. 5, p. 2, May 1997.
LexisNexis Academic, Debit Cards Payroll Card Ups Fees, Future Banker, p. 18, Oct. 6, 1997.
LexisNexis Academic, NTS' TransPay Debit Card Helps Remote and Unbanked Employees Get Funds Quicker, Financial News, Mar. 18, 1997.
LexisNexis Academic, On the Way, vol. 1997, No. 74, p. 2, Mar. 31, 1997.
Power, Denise, Loehmann's Compiles Shopper Data Via Credit Card, 2004.
MailFrontier Survey Finds that Consumers Hold Financial Institutions Accountable for Online Identitiy Theft, www.mailfrontier.com, Palo Alto, CA, Nov. 2004.
O'Conner, Maritz Gets MasterCard's Stamp of Approval, Business Travel News, Aug. 19, 1996, 2 pages.
Maritz, Incentive, Jun. 1996, Exclusively Yours MasterCards on p. 111.
McMonagle, Daniel, McMonagle, Chapter VII—Cash Balance Plans in a Traditional Defined Benefit World, as found on google.scholar (dev.soa.org, Jan. 2002), www.soa.org/.../monographs/retirement-systems/cash-balance-symposium/2002/january/m-rs02-3-07.pdf—May 7, 2009.
Meridian Award Cards, JA8251 (date unknown).
Meridian-the leader in card marketing, JA8343 (date unknown).
Meridicard vs. Debit Cards, JA7917 (date unknown).
Clark, Microsoft, Visa to Jointly Develop PC Electronic-Shopping Software, The Wall Street Journal, Nov. 9, 1994, WSJ B9.
Modification # 1 to the Authorization of the Financial Agent and Terms of Performance, Sep. 30, 1993, acs00277482.
Modification # 2 to the Authorization of the Financial Agent and Terms of Performance, Mar. 25, 1994, acs00277490.
Modification # 3 to the Authorization of the Financial Agent and Terms of Performance, Feb. 25, 1995, acs00277500.
Modification # 4 to the Authorization of the Financial Agent and Terms of Performance, Apr. 1, 1996, acs00277507.
More Retailers Turn to Co-Branding, Chain Store Age Executive with Shopping Center Age, Feb. 1, 1995, 3 pages.
Bogle, Mutual Funds at the Millennium Fund Directors and Fund Myths, The Vanguard Group to the '40 Act Institute of PLI (Practicing Law Institute), New York, NY, May 15, 2000, 15 pages.
National Automated Clearing House Association (NACHA), Business-to-Business EIPP Presentment Models and Payment Options Part One—Presentment Models, Jan. 2001, Counsel for Electronic Billing and Payment, (cebp.nacha.org).
New 1-800-Call-ATT Campaign Promotes One Number for All Calls, AT&T Marketing, News Release, www.att.com/press/0297/970217.csa.htm, Feb. 17, 1997, 2 pages.
Schwab, Charles, Now 7 Ways for a better Total Return for Your Money Schwat 1, The Inventor's Asset Management Account, Charles R. Schwab, Charles Schwab & Co., Inc., 16 pages, 2001.
Ostroff, Guide to Buying New Cars Used Cars Dealer Scams, Feb. 2, 2001, CarBuyingTips.com.
Pullar-Strecker, Tom, Pullar-Strecker; 'Kiwi card converts unlikely to lead smart revolution; Little support for changes to risk allocation' (2 Edition) Dominion. Wellington, New Zealand; Apr. 25, 2000, p. IT.6.
Paper or Plastic? With these three incentives, The Choice is Yours, Incentive, Feb. 1996, 2 pages.
Feldman, Judy, Pay by Check Over the Phone or Net, 2001.
Dugas, Payroll May Ask Paper or Plastic?, USA Today, 3B, Aug. 14, 2001, 1 page.
Youll, James, Peer to Peer Transactions in Agent Mediated Electronic Commerce, 2001.
Wolf, Harold A., Personal Finance, 2001.

Press Release, Mar. 5, 2004, Payment Data Systems Files Patent on Debit Card Payment Solution, American City Business Journals, Inc., Mar. 5, 2004.

Proton world and Europay to co-operate in creation of new CEPS-compliant e-purse application, Press Release 1999, Waterloo, Belgium, Jun. 28, 1999, 2 pages.

Brown et al., Purchasing Card Magic Eli Lilly Finds Accounts Payable Flying High With Plastic, Corporate Cashflow, vol. 15, No. 12, Nov. 1994, 2 pages.

Purse Application for Cross Border Use in Euro, Cordis, Pace 1st 1999-11531 Pace, www.cordis.lu, printed Feb. 23, 2001, 3 pages.

Quinn, Jane Bryan, Quinn, For Many College Youths, Credit Cards Easy to Get, American Express article; St. Louise Post-Dispatch; Feb. 3, 1989.

Ramsaran, Cynthia, Ramsaran, Co-Branded Cards Take Flight, Bank Systems & Technology, May 1, 2005, 52 (1 page).

Rolfe, Richard, Rolfe, Europes Cobranding Boom, Credit Card Management, Jan. 2003, vol. 15, No. 11, p. 16 (4 pages).

Request for Information submitted to Department of Health and Human Services by JPMorgan Electronic Financial Services, Request for Information for EBT Services, Aug. 10, 2006.

SK100 Smart Card Electronic Purse Balance Reader, SK100 Balance Reader, http//perso.wanadoo.fr, printed Feb. 23, 2001, 1 page.

Miller, Section E.2.1 Kerberos Authentication and Authorization System, Project Athena, Cambridge, MA, Dec. 21, 1987, 39 pages.

Sessums, Unbanked Citizens Draw Government Attention, vol. 9, No. 4, (1997) acs00280762.

Souccar, Smart Cards 1st Union Smart Card Pilot Enlists a Second Army Base, American Banker, Digital Frontiers, vol. 164, No. 61, Mar. 31, 1999, 3 pages.

Smart Cards Big Brother's Little Helpers, The Privacy Committee of New South Wales, No. 66, Aug. 1995.

None, Smart Cards Forging Into Credit Card Market, 1995.

Smart card for loyalty and e-purse applications eclipses capability of conventional mag-stripe cards, Press Release, www.l.sib.com, Apr. 21, 1997, printed Feb. 23, 2001, 3 pages.

SmartAxis Load Cash on to your E-Purse Card, Supported Currencies and Schemes, www.smartaxis.co.uk, printed Feb. 23, 2001, 9 pages.

Spurgin, Sopininmon! or What's Happening in the Retail Credit Card Environment, Credit World Journal, vol. 85, No. 4, Mar. 1, 1997, pp. 20-23.

Lacker, Stored Value Cards Costly Private Substitutions for Government Currency, Economic Quarterly, 1996, Economic Quarterly, v82, n3, pl (25), ISSN 1069-7225, 17 pages.

Lazarony, Stuck for a gift? Give a prepaid credit card, www.bankrate.com, Dec. 21, 1998, 1 page.

Rossman, Kenneth, Summary Appraisal of Real Property, 1998.

KEY, Swift Gift 'Wows' Internet Shoppers, PR Newswire, www.key.com/swiftgift/home.html, Dec. 2, 1998, 1 page.

Tah, J et. al., Tah et al., Information Modelling for a Construction Project Risk Management System, Engineering Construction and Architectural Management, 2000, vol. 7, No. 2, pp. 107-119.

The Campus Card Conundrum, Card Technology, Journal ISSN 1093-1279, p. 25+, Feb. 1998, pp. 1-8.

The Electronic Purse Reaches the Car Park, http\\docs.vircom.net/mobility/parking, printed Feb. 23, 2001, 2 pages.

The Evolution of a New Consumerism, Chain Store Age, vol. 73, Jun. 1997, pp. 8-9.

The Federal Transit Administration, TCRP Report 32 Multipurpose Transit Payment Media, Chapter 2 Multipurpose Fare Payment Overview, p. 10-20, 1998.

Stoughton, The Gift of Credit, www.washingtonpost.com/wp-srv/business, Dec. 14, 1998.

Nilson, H. Spencer, The Nilson Report, 1998.

Nora Wood, The Power of the Card, Incentive, Jul. 1997, 6 pages.

Stuber, The electronic purse an overview of recent development and issues, Bank of Canada, Technical Report No. 74, www.bankofcanada.ca, Jan. 1996, printed Feb. 23, 2001, 2 pages.

Anonymous, Two Chips Can Be Better Than One, date unknown.

Understanding the benefits Smartcity offers a number of important benefits to both the card issuers and their customers, http//www.icl.com/smartcards/benefits.htm, printed Feb. 27, 2001, 2 pages.

Langheinrich et al., Unintrusive Customization Techniques for Web Advertising, Computer Networks, vol. 31, 1999, pp. 1259-1272.

Universal Card free lifetime membership extended 3 months, AT&T Marketing, www.att.com/press/0297/970217.csa.html, Dec. 4, 1990, 2 pages.

Unknown, Unknown, Thai Smart Card to Expand Abroad (Smart Loyalty's Smart Bonus Program has 300,000 Cardholders in Thailand, the company plans to expand into markets that include Australia and Malaysia), Cards International, n. 183 p. 5, Sep. 22, 1997, (www.d.

Yee, Bennet, Using Secure Coprocessors, 1997.

Vivo Tech, ViVOtech, Inc. RF-Based Contactless Payment a more convenient way to pay, 2001.

Visa Cash—Where can I get it?, www.visa-asia.com/pd/cash/where.html, Feb. 23, 2001.

Visa Cash, www.visa-asia.com/pd/cash/main.html, Feb. 23, 2001.

Visa International and SERMEPA Announce Plans for Cross Border Visa Cash Based on CEPS, www.visa.com/av/news/praaamisc111699.vhtml, Nov. 16, 1999.

Visa first to launch electronic purse load via GSM mobile phone, www.cellular.co.za, Johannesburg, ZA, printed Feb. 23, 2001, 4 pages.

Visa releases visa cash electronic purse specifications based on CEPS, www.visa.com/av/news/PRaamisc042099.vhtml, San Francisco, Apr. 20, 1999.

Hansell, Visa to unveil electronic purse cards, New York Times, printed Feb. 23, 2001, 2 pages.

Ward, Getahn, Ward, New Debit Card is Introduced to Serve Unbanked Workers, News & Business, Jun. 23, 1999.

Wood, John et. al., Wood, et al., Electronic Transfer of Government Benefits, Federal Reserve Bulletin, pp. 203-217, Apr. 1997.

Welcome to Card Express CardEx, CardEx website archived by web.archive on Oct. 31, 1996, http//web.archive.org/web/*/http//www.cardex.com, retrieve Oct. 18, 2003, 7 pages.

Welcome to Card Express, The CardEx Incentive Card, as disclosed in the CardEx web site archived by web.archive.org on Feb. 7, 1998, http//web.archive.org/web/*/http//www.cardex.com, retrieve Oct. 18, 2003, 8 pages.

SWIFTGIFT, Welcome to Swiftgift, www.swiftgiftcard.com, Dec. 8, 1998, 10 pages.

Bowen, Cathy, Welfare Agencies Seek Aid From Smart Cards, 1998.

Wells Fargo Blazes New Trail for Homeowners, PR Newswire, New York, Oct. 2, 2002.

Wenninger et al., The Electronic Purse, Current Issues in Economics and Finance, vol. 1, No. 1, Apr. 1995, acs00098037.

Kenneth Hein, What's the Deal?, Incentive, Jul. 1998, 7 pages.

Machlis et al., Will smart cards replace ATMs?, Computerworld, printed Feb. 23, 2001, 3 pages.

* cited by examiner

SYSTEM AND METHOD FOR GRANTING PROMOTIONAL REWARDS TO BOTH CUSTOMERS AND NON-CUSTOMERS

RELATED APPLICATIONS

This application is a continuation-in-part of U.S. patent application Ser. No. 11/403,317, filed on Apr. 13, 2006, entitled "System and Method for Granting Promotional Rewards to Both Customers and Non-Customers," which claims priority to U.S. Provisional Patent Application Ser. No. 60/771,581 filed Feb. 8, 2006. The disclosure of both are incorporated herein in their entirety.

This application is generally related by subject matter to the following applications: U.S. patent application Ser. No. 10/683,294, filed Oct. 14, 2003, entitled "System and Method for Granting Promotional Rewards to Credit Account Holders," U.S. patent application Ser. No. 11/221,706, filed Sep. 9, 2005, entitled "Terminal for Implementing Simultaneous Reward Programs," U.S. patent application Ser. No. 11/185,847, filed Jul. 21, 2005, entitled "Personalized Bank Teller Machine," and U.S. patent application Ser. No. 11/504,557, filed Aug. 14, 2006, entitled "System and Method for Granting Promotional Rewards to Both Customers and Non-Customers," which is also a continuation-in-part of U.S. patent application Ser. No. 11/403,317. All of the aforementioned are hereby incorporated by reference in their entirety.

BACKGROUND

The present invention is generally directed to incentive programs for enabling both bank customers and non-bank customers to earn promotional awards. More particularly, the present invention is related to techniques for providing personalized promotional awards to bank customers for specific triggering behaviors, and for providing promotional awards to non-customers when using bank services.

There is a recognized need in the financial services industry to attract and retain loyal customers. A loyal customer is one who uses a single Bank for all or a significant number of banking relationships and does so over an extended period of time. The attraction and retention of loyal customers is particularly important to Banks that compete in highly competitive markets where customers are offered a wide variety of investment and other banking relationship options, some of which may individually be very enticing to existing customers of other banks.

Incentive programs, comprising of rewards and/or promotions may be used by various merchants to stimulate potential customers and to maintain the interest of existing customers. Rewards are typically given to customers by merchants for various reasons, including to encourage certain customer behaviors and to strengthen relationships between Banks and customers. Rewards can also be used to strengthen the relationships between merchants and customers, such as when a Bank offers a merchant-related reward such as a gift card, or for example, when a merchant or affiliated Bank offers a reward for using a particular credit card with the merchant.

Promotions may be directed at both existing and potential customers, and often center around "give-aways" and prizes. Promotions generally cause consumer interest in a merchant or a product of a merchant who may leverage this interest in an effort to generate new customers.

Incentive programs for rewarding existing customers have become increasingly common in a variety of industries. Well known examples are airline frequent flyer programs. In airline frequent flyer programs the customer is awarded points, often expressed in terms of "miles traveled" for each use of a particular airline or its partners or affiliates. Additional points or "miles" are awarded for use of ancillary services such as car and hotel room rentals.

Other well-known examples of promotions range from the Publisher's Clearing House™ Sweepstakes to McDonalds's™ Monopoly™ program.

However, the implementation of rewards and promotional programs directed at Bank customers has complexities not found in other industries. The relationships between the Bank and any customer may be quite numerous and complex, involving a number of different kinds of accounts and interactions. Additionally, unlike retail shopping, Bank customers are less likely to switch Banks based upon a generic promotion.

For an incentive program to be effective as a tool for both attracting potential customers and retaining existing customers, it may be desirable for the Bank to be able to monitor customer behaviors and the relationships between the Bank and its customers, so that the Bank may identify significant opportunities for marketing its financial services.

It may further be desirable for both existing and potential customers to track and manage their incentive programs. In addition to presenting the existing or potential customer with more control over the incentive program, providing customers with the ability to manage their incentive programs may provide the Bank with another channel of communication through which to reach existing and potential customers. It is known for Banks to develop incentive programs to attract and retain customers, typically consisting of a financial product such as a credit card that may allow customers to earn rewards in a predetermined rewards system. For instance, it is known in the art to offer a 1% cash rebate each time a customer uses a platinum credit card issued by the Bank. Such systems are disclosed, for example, in U.S. Pat. No. 5,025,372, to Burton et al., and assigned to Meridian Enterprises, Inc.

However, the known universe of reward-earning behaviors for such incentive programs is generally limited. Rewards are typically earned by charging transactions on a credit card account. Alternatively, rewards may be earned by performing certain tasks or exhibiting certain behaviors, such as by opening a bank account.

Known incentive programs generally have little penetration into the supply of potential customers. However, automated banking machines are well known, and are used by both existing and potential customers alike. A common type of automated banking machine used by consumers is an Automated Teller Machine (hereinafter "ATM"). ATMs enable both existing and potential customers to carry out a variety of banking transactions by interacting with the machine rather than a human teller. Examples of banking transactions that are commonly carried out using ATMs include withdrawals, deposits, transfer of funds between accounts, payment of bills, and account balance inquiries. Accordingly, it is desirable to use ATMs as a distribution vehicle for incentive programs.

Moreover, prior art incentive programs typically have limited reward-earning behaviors that earn limited rewards. A robust and efficient system of offering a plurality of incentive programs wherein the incentive programs enable existing and potential customers to earn a variety of rewards by accomplishing a variety of behaviors and/or transactions is desirable. It is further desirable to have an incentive program system that is customizable across a wide variety of variables.

Customers, as described above, may have one or more rewards accounts with a financial institution. Typically, a customer is not able to access such rewards accounts at an ATM, which is used as described above for access to the customer's other accounts. This results in inconvenience to the customer since they have to use alternative methods to access the rewards accounts and conduct transactions therewith. Providing a customer access to their rewards accounts at an ATM and the ability to conduct transactions against the rewards account is desirable.

SUMMARY OF THE INVENTION

Aspects of the invention include systems and methods of using an interface and/or other similar device to access a rewards account. The customer may access the interface using a card or other device. The card or other device may be presented to the interface in any one of numerous manners, including, but not limited to, physical insertion into the interface, swiping at a designated location, and/or passing over a designated location. The access to the interface or similar device may be granted upon validation of the customer's identity. Account information associated with the customer may be retrieved by the interface or device. The customer may have a rewards account. The rewards account may have a point balance that is available for customer use and access. The rewards account may be presented to the customer along with the customer's other accounts, such as a checking, savings, and/or a loan account. Through the interface, the customer may perform various actions upon the rewards account. The actions may include, but are not limited to, a balance inquiry, a withdrawal, an account transfer, and preferences. For the withdrawal and account transfer actions, the rewards account may have minimum redemption value associated with it for each action. The rewards account may also have a conversion factor applied to convert the rewards points into currency. Subsequent to or coincident with a withdrawal or account transfer, the rewards account may be debited an appropriate amount to equate to the amount of the withdrawal or account transfer. The withdrawal may be in the form of cash or a reward, tangible and/or intangible. The customer may be able to perform more than one action on the rewards account and/or perform actions on other available accounts. Following the completion of the customer's transaction, a receipt may be dispensed from the interface. The receipt may include the rewards account balance.

Further embodiments provide methods and systems for accessing and modifying preferences at an interface or other similar device. An interaction from a customer is received, at an interface. The interaction involves at least receiving identifying information from the customer. One or more accounts associated with the customer are determined using a computer processor. The one or more available accounts include at least a rewards account. The rewards account may have a rewards balance associated therewith. A menu is presented to the customer. The menu includes preference information. The preference information may include options relating to the one or more accounts. The options may include rules regarding processing and maintaining of the one more accounts, including the rewards account. A selection from the menu is received from the customer. A transaction for the one or more accounts is received. The selection is applied to the processing of the transaction.

It is to be understood that both the foregoing general description and the following detailed description are exemplary and explanatory only, and are not restrictive of the invention as claimed. The accompanying drawings constitute a part of the specification, illustrate certain embodiments of the invention and, together with the detailed description, serve to explain the principles of the invention.

DESCRIPTION OF THE DRAWINGS

In order to assist in the understanding of the invention, reference will now be made to the appended drawings, in which like reference characters refer to like elements. The drawings are exemplary only, and should not be construed as limiting the invention.

DETAILED DESCRIPTION OF THE INVENTION

Figure 1:
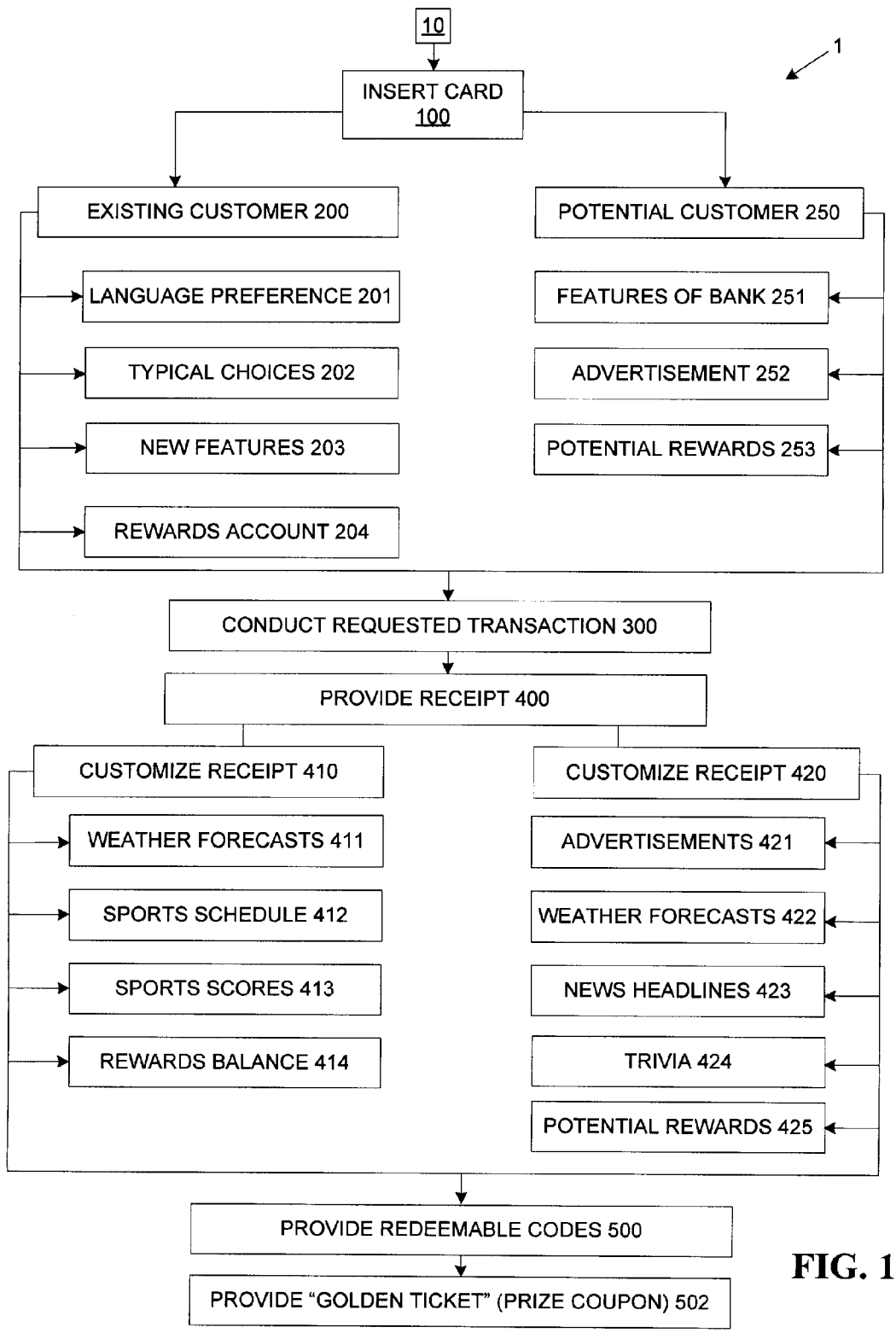
FIG. 1 is a block diagram, illustrating a financial transaction in accordance with exemplary embodiments of the present invention.

As used herein, "Bank" or "Banks" refers to financial service institutions, including banks, savings and loan associations, credit unions, credit card issuers, and the like, which offer a variety of financial and investment services to customers, such as credit cards.

While much of the description below is set forth in terms of credit cards, it should be understood that the invention is readily applied, and should be considered to encompass, ATM based promotional and reward programs provided in connection with the use of other types of payment cards, including debit cards, check cards, transaction cards, ATM cards, prepaid debit cards, gift cards, stored value cards, other payment devices and the like.

As used herein, "Bank branch location" means any physical, brick-and-mortar, Bank location. The "Bank branch location" may offer either a limited or full selection of Bank programs, products, or services.

As used herein, "code" or "codes" refers to a number, sequence of numbers, alpha sequence, alpha-numeric sequence, or a sequence of symbols, images, etc. sequence provided as a reward or promotional gift to an existing or potential customer. Just by way of non-limiting example, a "code" may be indicative of a particular prize or offer, or it may be indicative of a certain number of "points" or other expression of a reward.

As used herein, "customer" means people and/or legal entities that use or receive any service or purchase any goods from the bank. "Customers" can be "existing customers" and "potential customers."

As used herein, "existing customer" or "existing customers" refers to a customer of record with a bank. This includes all customers who have any type of account with the Bank or relationship with the Bank.

As used herein, "points" mean a numerical indicator corresponding to redeemable value. "Points' may be redeemed for various prizes, products, and services, with each of the prizes, products, or services requiring the expenditure or redemption of a particular amount of "points." It should be understood that "points" can be expressed as such, e.g., 1000 points, or can be expressed in other units, such as "credits" (e.g., 1000 credits), "miles," or any other suitable unit identifier.

As used herein, "potential customer" means people who are not existing customers. "Potential customers" may or may not patronize Bank services, such as ATMs.

As used herein, "triggering behavior" means any consumer behavior that can trigger the earning of rewards in a rewards program.

As used herein, "reward" or "rewards" means some type of consideration or recognition established and given by the Bank, the Bank's partners, or third parties to the customer in recognition of the customer's specific behaviors in the specific time frame, such as gifts, cash rebates, frequent flyer miles, and points.

Reference will now be made in detail to embodiments of the invention, examples of which are illustrated in the accompanying drawings. Banks may offer incentive programs to both existing and potential customers. Incentive programs may be broken down into rewards programs typically directed at existing customers, and promotional programs typically directed at both existing and potential customers. According to one embodiment of the invention, rewards programs may reward a customer for particular behaviors, known as trigger behaviors. According to one embodiment, promotional programs may involve an element of chance and provide prizes to both existing and potential Bank customers.

The discussion below will generally be divided into discussion directed to promotions and rewards.

Promotions

A promotional system and method in accordance with some embodiments of the present invention will now be discussed. As noted above, ATMs may provide penetration to potential customers. Therefore, ATMs may be poised to be a distribution vehicle of promotional material to existing and potential customers alike. Similar to ATMs, point-of-sale (POS) devices may also provide penetration into the market of potential customers. It is contemplated that while ATMs are discussed below, similar promotional programs could be conducted using POS devices.

In accordance with some embodiments of the present invention, ATMs may be used to dispense so-called "golden tickets," or printed indicia, representing a particular prize. A "golden ticket" may have characteristics to immediately draw the attention of the customer, for example the ticket may be brightly colored gold. A "golden ticket" may be of a similar size and shape of the currency the ATM distributes, such that no machine modifications to the ATM will be required.

A "golden ticket' may be distributed randomly, which is intended to mean that "golden tickets" are not provided to each and every ATM user for each and every transaction. Instead, the tickets are provided sporadically in a fashion that has at least the appearance of being random to ATM users. For example, a golden ticket could be provided to each nth customer, such as to every 100 customers. Such an approach would be random within the context of the invention since it would appear to be random to the ATM users. Alternatively, a pseudo-random algorithm or other random number generating algorithm could be used to randomly distribute "golden tickets." For example, a "golden ticket" may be distributed to every nth customer of customers meeting certain criteria, such as residents of a particular state. Such algorithms for generating true random numbers or pseudo-random numbers are well known in the statistical arts.

It is also contemplated, however, that the "golden ticket" may be anything indicating to the customer that he or she has won or been awarded some form of a prize. For example, the "golden ticket" may be in the form of a rider removably attached to dispensed currency with adhesives (e.g., a "sticker"). The "golden ticket" may be a screen display on the ATM, informing an existing customer that a set amount of points or value has been added to their rewards account, or informing a potential customer that they should enter the nearest Bank branch location to redeem their prize. In other words, the "golden ticket" need not be a physical ticket. It need only inform the customer that a specified prize, points, or value, may be redeemed.

The prizes awarded through ATMs may vary, ranging from discounted or free Bank services to tangible goods, virtual rewards and potentially money. For example, the "golden ticket" may represent an extended period of free bank services (e.g., checking), a reduced rate for bank services (e.g., 50% off financial planning services), or reduced interest rates for particular loans or equity arrangements. The "golden ticket" may also represent free or discounted services offered by third parties (e.g., free cellular phone service, or reduced rates for digital cable). The "golden ticket" may also, for example, entitle the customer to particular tangible goods, such as sports equipment or electronic equipment (e.g., a new television). The "golden ticket" may also entitle the customer to a specified amount of money (e.g., $1,000 or $10,000). The "golden ticket" may be a virtual reward. The virtual reward may be an indicia upon the receipt. The indicia may be a bar code, a voucher number, a confirmation code, or other similar number and/or code imprinted upon the receipt. The receipt, with the indicia thereon, may be presented for redemption. The presentation may occur at the financial institution, a merchant, or other similar entity. Upon presentation, the entity may present the customer with their reward. The virtual reward may represent various award types, including, but not limited to, stored value, cash value, and/or a physical item. For example, the customer may receive a receipt with a bar code printed thereon that entitles them to a free cup of coffee at a local coffee shop.

Redemption of the prizes may be required to occur inside a Bank branch location. The customer may or may not know what prize he or she is entitled to before attempting to redeem the "golden ticket" in the branch location. For example, the "golden ticket" may notify the customer that they are entitled to a prize of sorts, but may note that the prize can only be identified and redeemed inside a Bank branch location. The "golden ticket" may be redeemable at any Bank branch location, or redemption may be available only at particular Bank locations (this may be required for more substantial, valuable prizes). According to another approach, the "golden ticket" may identify the nature of the prize. According to yet another approach, the "golden ticket" may provide a phone number or web address for the customer to access in order to learn the nature of the prize.

Encouraging traffic of potential customers into Bank branch locations may be a valuable service to the Bank, because the presence of a potential customer in a Bank branch location provides various opportunities to convert the potential customer into an existing customer.

The customer may redeem the "golden ticket" by providing the "golden ticket" to a Bank teller or Bank officer. The customer's prize may be immediately available, or may be provided to the customer at a later date (i.e., if the prize needs to be shipped or if security verifications must take place). For some prizes, the customer may redeem the "golden ticket" by going to a web page operated by the Bank and inputting a indicia (e.g., a unique code) that may be printed on the "golden ticket." The customer may then follow additional steps as necessary to redeem his or her prize.

Alternatively, a code may be printed on the bottom of ATM receipts, or on a separate receipt. The code may be redeemed at the customer's personalized web page or at a web page operated by the Bank for such redemption. Alternatively, the ATM receipt may be brought into a Bank branch location to determine what the prize or amount of points may be redeemed with the code.

The codes may be indicative of particular points, or airline miles that may be applicable to a frequent flyer program. Both existing and potential customers may redeem these codes by visiting specified web pages (which, after registration may include a customer's personalized web page).

It is contemplated that in order to comply with various laws and regulations, such promotions may also be entered via the mailing of an address card to a specified address.

Business rules may be programmed in an ATM (or into a remote server or computer driving the ATM's functionality) to analyze an ATM user's profile and offer additional services. For example, if the user has an overdraft balance and a mortgage, an offer for a second mortgage or refinancing may appear. Similarly, if the user has a large balance in a savings or checking account, brokerage or other investment services may be offered.

Business rules may also be programmed to analyze the user's profile and provide coupons, messages ("alerts"), or other information to potential customer users based on the identity of the potential customer's present bank. When a potential customer logs on or accesses a bank or other financial institution's ATM system (e.g., to obtain dispensed currency), the ATM may identify the potential customer's home banking institution (e.g., using the BIN, Bank Identification Number, from the potential customer's card or payment device that is swiped, inserted, entered, read, blinked, or where the information is otherwise transferred from the customer's card or payment device to the ATM system). A message may be sent to the potential customer identifying products or services that are offered by the bank providing the ATM service but not offered by the potential customer's present banking institution. Upon determining what the potential customer's home banking institution is, the ATM may determine what services or programs that banking institution does not provide. For example, if the potential customer's home banking institution does not offer investment accounts or lines of equity, the ATM may display a message informing the potential customer that the Bank does offer these services. The services advertised may be determined in conjunction with the incentive programs. For example, if the ATM determines that the customer's home banking institution does not offer lines of equity, the ATM may advertise this service, and the code printed on the ATM receipt may entitle the potential customer to a temporary reduced interest rate on such a line of equity.

Rewards

A portion or all of the Bank's existing customers may be enrolled or participating in a rewards program, depending on the eligibility rules of the program. Eligibility rules may include local, state, and federal laws and regulations pertaining to promotions. It is contemplated that if any local, state, or federal law or regulation covers any aspect of the rewards or incentive program, the rewards or incentive program may be contoured accordingly. Potential customers may also be enrolled in the Bank's rewards program by providing specific information to the Bank. This may result in a personalized web page being set up for the potential customer so that the potential customer can manage his or her rewards. However, it is contemplated that while existing customers may receive a wide array of rewards from both the bank or affiliated third parties, rewards of a potential customer may be limited to discounted or free Bank products and services. In other words, for a potential customer to redeem his or her rewards, the potential customer may become an existing customer.

For existing customers, the rewards program may be associated with a customer account. Customers may choose from among a variety of rewards programs for a particular customer account. A rewards database may store customer-specific reward information for each customer, either existing or potential, enrolled in the Promotional Rewards Program.

The Bank may administer the rewards program. Alternatively, the rewards program could be administered by another entity, such as a Bank Partner or third party. A third party may be employed by the Bank to formulate, manage, and maintain the Bank's incentive programs.

The rewards program is generally associated with one or more earning behaviors (such as transactions) and one or more rewards which can be earned by the customer engaging in those behaviors. These behaviors may be referred to as "triggering behaviors," and are discussed in more detail below.

The Bank or third party may create rules or other information defining and governing the rewards program. These rules may govern various aspects of the rewards program, including but not limited to, the offers, the rewards, the redemption process, and the eligible population. A rule may comprise any instruction, parameter, macro, subroutine, program, or any other instruction set that may apply to one or more customers or population groups or any feature defining the rewards program.

Accumulation rules and redemption rules and options may similarly be established. Accumulation rules may, by way of example only, limit the number of rewards or points that can be accrued and redeemed by a customer. Redemption rules may also, by way of example only, require various identification procedures and various security processes. These rules may also define limitations for earning rewards currency and/or rewards.

The rules may also specify attributes or characteristics that limit or define the events, transactions, and triggering behaviors for which a customer may earn a reward or rewards. These attributes or characteristics may comprise transaction date, time, location, frequency, amount, and/or other triggering attributes.

Rewards accounts may be created and may be stored in a database. For existing customers, the reward account may be associated with one or more accounts the existing customer has with the bank. For potential customers, the reward account may only be associated with an indicia of identification of the potential customer (e.g., name, social security number, etc.). The reward account for existing customers may track the customer's transactions with the bank, and may provide additional rewards for passive actions (e.g., leaving funds in a savings account for a certain period of time). Reward accounts established for potential customers may only track the potential customer's interactions and transactions with the Bank, (e.g., ATM transactions). A personalized web page may access a rewards account in this rewards database, as discussed in more detail below.

In general, the rewards system may monitor customer transactions and behaviors in order to determine reward earnings. Based on personalized information (such as customer account information), specific rewards may be generated for the populations eligible to participate. The rewards system may additionally communicate the reward earnings to the customer, and report earnings information for internal or external auditing purposes.

As defined by the reward program, specific transactions and/or behaviors may earn rewards. For instance, an offer may define a population as all customers in Alabama, and the reward may be provided to Alabama customers based on customer address data. A reward such as this could be targeted at particular customers for a variety of reasons. For example, the reward may consist of reduced or free goods or services from local third parties, or may be directed at something of a local interest, such as a sports team. Additionally, rewards may be tailored based on customer location due to various laws and regulations governing such rewards and promotions in various states and localities. These types of geographic directed rewards may be focused at a specific population based on where, for existing customers, their domicile is listed on their account information, and/or based on where the customer transacts business with the Bank. In other words, although the domicile of a potential customer who uses the Bank's ATM may be unknown, the location of the ATM being used is known, and a reward may be tailored according to the ATM's geographic location.

As noted above, rewards of a potential customer may be limited to discounted or free Bank products and services. For a potential customer to redeem his or her rewards, the potential customer may become an existing customer.

Spending patterns of existing customers may similarly be analyzed, and based on such analysis, customers may receive more focused offers. When a customer uses a Bank credit card or Bank debit card (or other purchase card) to purchase various goods or services, the general category of the merchant with whom they are dealing is transmitted to the Bank. By way of example only, the Bank may be aware that a particular customer has used his or her debit card to spend a particular amount of money over a particular period at gasoline stations. With this information, the Bank may tailor then the customer's future rewards to gasoline station discounts and the like.

A customer may also earn a reward or reward currency (i.e., points) for the occurrence of specific triggering behaviors, transactions, and events related to a specific bank product. For instance, customers may earn rewards for payments, purchases, opening an account, first use of a product or account, cash advances, or another reward trigger in a demand deposit account, credit card, or other bank product and/or service.

In some embodiments in accordance with the present invention, rewards (such as points) may be earned for any of a variety of triggering behaviors or activities, such as enrolling in a program or service or establishing a relationship with a merchant or financial institution, such as by opening an account, applying for a car or home loan (or equity line of credit). Other triggering behaviors related to a relationship include signing up for (and doing) online bill payments from a specific account, staying in (and/or using) a program for a period of time (e.g., to earn program anniversary rewards), and ACH activity.

In some embodiments, rewards may be granted for establishing relationships with particular third parties with whom the Bank has a relationship with. For instance, a reward may be granted for obtaining a car loan from an automobile financing division of a bank that manages the reward account. A reward may also be granted for applying for a home loan or refinancing (or other loan or transaction), or for making monthly payments or maintaining an account pursuant to any such loan or transaction. The partner can be a true third party, such as a company the Bank co-brands a card with, e.g., a department store, a car manufacturer, and so forth.

Additional triggering behaviors which may cause rewards to accrue may comprise: credit and debit card transactions, such opening an account, paying a balance, paying interest, and linking with another account; other transactions associated with the Bank offering the reward, such as making a deposit, making a withdrawal, paying interest, drafting a check, paying a fee for a banking service; loan transactions, such as paying interest, transferring a balance, issuing a convenience check, and accessing a line of credit; a merchant purchase; checking and savings account activity; account payment transactions, such as setting up a recurring payment, enabling an auto-payment, paying an annual fee, or paying a rewards fee; transactions with Bank Partners; transactions with third parties; brokerage transactions, such as purchasing, selling, or trading stock or other securities; creating, purchasing, or otherwise transacting an interest in a mutual fund or margin account; depositing funds; creating a retirement account (such as an IRA or 401(k) account), contributing to or managing such an account, borrowing against such an account, or otherwise causing activity related to such an account; requesting information related to a product; purchasing insurance (such as home, auto, disability, or life insurance); and transferring holdings from an external account to a Bank account; and other transactions or behaviors.

It should be noted that some triggering behaviors do not necessarily require any specific action on the part of the cardholder. For example, the triggering behavior can be passive. For instance, in some circumstances maintaining a minimum account balance might be satisfied by merely refraining from withdrawing funds from the account. In some embodiments, customers may earn instant rewards, such as rewards that are earned immediately upon completion of a reward-triggering behavior. For instance, a customer may have a chance of winning an instant 20% rebate on any purchase during a specific month, or a customer may have a chance of winning a 10% coupon for visiting a particular merchant store, wherein the coupon is printed (or otherwise redeemable) instantaneously at the merchant premises.

As mentioned above, an existing customer's financial transactions may be tracked as to their general usage, thereby allowing more directed rewards (e.g., if a certain amount is spent on gasoline, points may be redeemed in free gasoline). Accordingly, it is contemplated that triggering behaviors may include a customer spending more than a predetermined threshold amount towards a particular usage. By way of example only, if a customer spends more than $100 in a month on gasoline, then the customer may be eligible for a particular reward. The reward may, but is not required to be, related to the underlying purchases. In other words, the reward may be a coupon for reduced price gasoline, or a lower incentive rate on new automobile loans.

Mortgages may play two roles in the incentive program. First, mortgage payments and/or their methods of payment (e.g., automatic bill-pay) may qualify as triggering behaviors. For example, making full and timely mortgage payments for a specified period of time may entitle the customer to a particular reward. Making payments through automatic bill-pay, making payments in excess of the amount due, or making payments early may similarly entitle the customer to a particular reward. These various attributes of mortgages may also entitle the customer to specified amount of points.

Second, mortgage features may also be redeemable as chance prizes. For example, prizes may consist of lower mortgage rates, discounted monthly payments, a month's payment free, or perhaps a "golden ticket" of having a Bank mortgage paid in full.

According to another approach, the "purchase" of CDs may be considered a triggering behavior. Similarly, the timely redemption of CDs may be considered a triggering behavior. These purchases or redemptions may also be entitle a customer to a specified amount of points.

A feature of some embodiments of the present invention is a personalized web page for all customers. The personalized web page may be initially set up when a customer receives a reward. When a customer visits a specified web site to redeem their reward or code, the customer may be prompted to enter identification information. This information may be utilized to determine if the customer is an existing customer. If the customer is not an existing customer, she may optionally be prompted with a questionnaire regarding her current banking programs. This information may be utilized to direct focused advertisements at the potential customer.

When existing customers sign up for an account of any kind with the Bank or enroll in any relationship with the Bank, the existing customer may be automatically enrolled in the incentive program, and a personalized webpage may be automatically generated for the customer. The customer may then access the personalized webpage via a link on a webpage regarding the customer's Bank account or relationship.

The web page may report to existing and potential customers their reward status (i.e., how many points the customer has accumulated, how many points are required for particular rewards, etc.). Based on information known about the customer and their accounts, marketing material may be focused and delivered to the existing customer on their web page. For existing customers, this information may include information regarding the status of customer accounts with the Bank. For potential customers, this information may be limited to the rewards and points accrued by the potential customer.

The personalized web page may customize the customer's statement of any account rewards, including information such as transaction history, reward earnings balance, reward earnings history, available reward programs or offers, rewards (such as earned coupons or rebate checks), or other information. The personalized web page may provide periodic summaries of earnings, balances, and redemption activity that can be separate from or part of reward account statements. The customer's history of reward earnings may be also be tracked by the qualifying trigger types, attributes, and/or by specific product or account. The information available on a potential customer's web page may, however, be limited to the codes, points, and other information known about the potential customer through the potential customer's inputs into the web page. The personalized web page may also allow customers to access their accounts and redeem rewards and promotions online.

In addition, the personalized web page may communicate to an existing customer what the customer must do to earn a particular reward, such as how many points would be earned for making purchases (or a specific purchase) using a credit card compared to how much would be earned for making the purchase using a debit card. The personalized web page may similarly communicate to a potential customer how many points or redemption options the potential customer would have available if the potential customer became an existing customer.

Similarly, the personalized web page may include content providing suggestions on what to do to optimize reward earnings. Both existing and potential customers may visit their personal web pages to manage their rewards and incentives. The personalized web page may also be used as another communication channel for the Bank to communicate with both existing and potential customers.

Communications with potential customers may be especially valuable because it may be one of very few avenues the Bank has of directly reaching potential customers. Through the website platform, tracking the potential customer's use of the Bank's products, and through information known about the potential customer's home bank, (i.e., interest rates, availability of particular services, etc.) the Bank may be able to provide more directed and useful information to the potential customer.

Additionally, through the website platform, the Bank may track the interaction of the various accounts and relationships the customer has with the Bank. By providing an instrument to access various Bank records, the Bank may be more aware of which customers have which various relationships with the Bank. In this manner, transactions in various accounts (e.g. credit cards, debit cards, investment accounts, etc.) may be linked.

Redeemable points or chances may also be awarded based on savings account deposits, frequency of deposits, and duration of deposits. For instance, if a customer maintains a minimum threshold amount of funds in their savings account for a minimum period of time, the customer may be entitled to an amount of points corresponding to the value and duration of their savings account. Similarly, a customer may be awarded points for frequently making deposits in the customer's savings account, for example once a week. Additionally, a customer may be awarded points for the manner in which the deposits into the savings account are made (e.g. through direct deposit from payroll, etc.).

Reference will now be made in detail to some embodiments in accordance with the present invention, examples of which are illustrated in the accompanying drawings.

With reference to FIG. 1, the steps of a financial transaction 1 conducted at an ATM will now be discussed. A customer 10 may approach an ATM to withdraw cash or use other services, such as checking balances, obtaining stamps, transferring funds, etc. The customer 10 may be an existing customer or a potential customer. The customer 10 may insert their ATM card into the ATM at step 100. The ATM card may be a card known and widely used in the art, consisting of a plastic card with a machine readable medium (e.g., a bar code or magnetic stripe) imprinted on the card. However, it is also contemplated that the customer's ATM card may be a "smart" card, a biometric card, and/or may communicate with the ATM through radio frequency identification (RFID card). Examples of existing RFID cards are the Chase Blink card and the MasterCard PayPass product. While this and other figures below are discussed in terms of the customer inserting an ATM card into the machine, other payment card devices could be inserted, such as debit cards, check cards, prepaid cards, gift cards, and so forth.

The ATM may be programmed to determine from the customer's ATM card whether the customer 10 is an existing customer of the Bank who provides the ATM. This information is generally easily deduced from the account information stored on the ATM card. If the customer 10 is an existing customer, then the process may follow step 200. If the customer is not an existing customer, but is a potential customer, then the process may follow step 250.

For existing customers, the ATM display and transaction may be personalized to the particular customer at step 200. For example, at step 201 the customer's language preference may be set. The customer's language preference may be set based upon the customer's options chosen when setting up his or her account at Bank, or the language preference may determined from the customer's last ATM use.

At step 202 the customer's most often selected choices may be presented. For example, if the customer consistently uses the ATM to withdraw funds from his or her checking account, an initial option may be "withdraw funds from checking account." More particularly, if the customer typically withdraws $80.00 from his or her checking account, an initial option may be "withdraw $80.00 from checking account." If the customer typically conducts several transactions at the ATM, such as viewing account balances, transferring funds and withdrawing funds, the customer may initially be presented with each of these options.

At step 203, new features or products that may be of interest to the existing customer may be displayed. For example, if the customer is known to have a mortgage with the Bank, the ATM may display refinancing options available through the Bank. Similarly, if the customer has an investment account with the Bank, the ATM may display new investment opportunities or products that the customer may be interested in.

Optionally, at step 204, the ATM may display the customer's rewards account. The display of the customer's rewards account may be a default display, or, in order to advertise the rewards program, for a limited time the display of the customer's rewards account may be the initial screen. Display of the customer's rewards account may also an option that may be selected along with options such as "view balance in checking account," "view balance in savings account," "withdraw funds," or "transfer funds."

For potential customers, the ATM and transaction may be personalized in a different manner at step 250. The ATM may determine, from the potential customer's ATM card, what their current banking institution is. At step 251, for example, the ATM may display Bank features that the Bank supplying the ATM may provide, that the potential customer's present bank does not. Or the ATM may display how the Bank supplying the ATM provides features or services in a manner that is more beneficial or advantageous than similar or same features as the consumer's home bank. For example, the ATM may indicate that the Bank provides free checking whereas the home bank charges for checking, that the Bank's credit card APR is 12% while the home banks credit card APR is 14.5%, and so forth. The features displayed may range from the somewhat large, for example mortgage options, to the everyday, for example reduced fees for using other bank's ATMs. If the customer consistently uses the ATM for features that are available through the customer current banking institution (e.g., to withdraw funds from their checking account), the ATM may display an alternative message encouraging the customer to switch to the ATM's Bank. This message may say, by way of example only, "Why pay ATM fees? Join Bank today!" or something similar.

At step 252, the ATM may display other advertisements directed to the potential customer. These advertisements may range from normal Bank slogans and/or logos, to information about the Banks rewards program.

At step 253, the ATM may display the amount of rewards the customer would earn if they became an existing customer. For example, the ATM may inform the customer that if the customer joins Bank, they would have accrued a certain number of frequent flyer miles. Alternatively, the ATM may inform the customer that if the customer joins the Bank, the customer would be entitled to the various discounted Bank services that may be redeemed by points accrued through ATM use.

At step 300, the ATM may conduct the requested transaction of the existing or potential customer. In other words, if the customer selected options to withdraw $40.00, the ATM would dispense $40.00. If the customer selected options to view balances or transfer funds, the ATM would display balances or would transfer funds.

At step 400, the ATM may provide the existing or potential customer with a receipt containing normal transaction information. This receipt would contain the typical information, such as account identifiers, time and date of the transaction, the nature of the transaction, the ATM that conducted the transaction, and any other appropriate information.

For existing customers, at step 410, the receipt may be further customized. For example, the receipt may have weather reports 411, schedules 412, or particular sports scores 413 printed on the receipt. This customization may be based on the existing customer's previous selections, or may be based on various patterns indicating that the customer may be interested in this information. In other words, if the customer fits a certain demographic profile the information may be so contoured. For example, if the customer is a 27 year old male, the ATM may display the schedule for local sports teams on the bottom of the receipt.

The receipt may also provide a rewards account balance to the existing customer at 414. The receipt may indicate to the customer the customer's balances (e.g., the number of points accrued, the number of frequent flyer miles accrued), as well as any prizes that the customer has earned or won that are pending redemption in a Bank branch. The receipt may delineate the amount of rewards that the customer has earned for the present transaction, and may also provide a balance of the total rewards the customer has accrued.

For potential customers, the ATM receipt may also be customized at step 420. The receipt may have directed advertisements at 421, optionally based on the transaction the customer just conducted (e.g., if the customer withdrew money from savings, advertise the Bank's savings account rate). The receipt may also have general interest information, such as weather reports 422, news headlines 423, or trivia 424. Optionally, the receipt may inform the potential customer what rewards they would have accrued if they became existing customers of the Bank.

Step 500 is optional, and comprises a promotional aspect. At step 500, redeemable codes (representing some indicia of a reward, e.g., points or frequent flyer miles) may be printed on the bottom of the ATM receipt for both existing and potential customers. Including the code on potential customer's receipts may drive some potential customer traffic to the Bank's redemption web page.

At step 502, the ATM may dispense, along with requested funds or a receipt a "golden ticket" to both existing and potential customers. This golden ticket may be redeemable for a prize. Prizes may range from discounted or free Bank services to money, physical prizes, and/or virtual rewards. Prizes may optionally may only be redeemed in a Bank branch location, in order to drive more traffic into a branch. As discussed above, the "golden ticket" may be in a variety of sizes, shapes, colors, and forms. The "golden ticket" may be a ticket actually dispensed with funds, or the "golden ticket" may be a rider (e.g. sticker) that may be placed on the dispensed receipt. The "golden ticket" may also be printed on a receipt, or may be separately dispensed with a receipt, i.e. printed on its own receipt. Additionally, a notice to the customer that a "golden ticket" has been awarded may be displayed on the ATM screen. This notice may direct the customer to either a Bank branch location or to the customer's personalized rewards account webpage.

Figure 2:
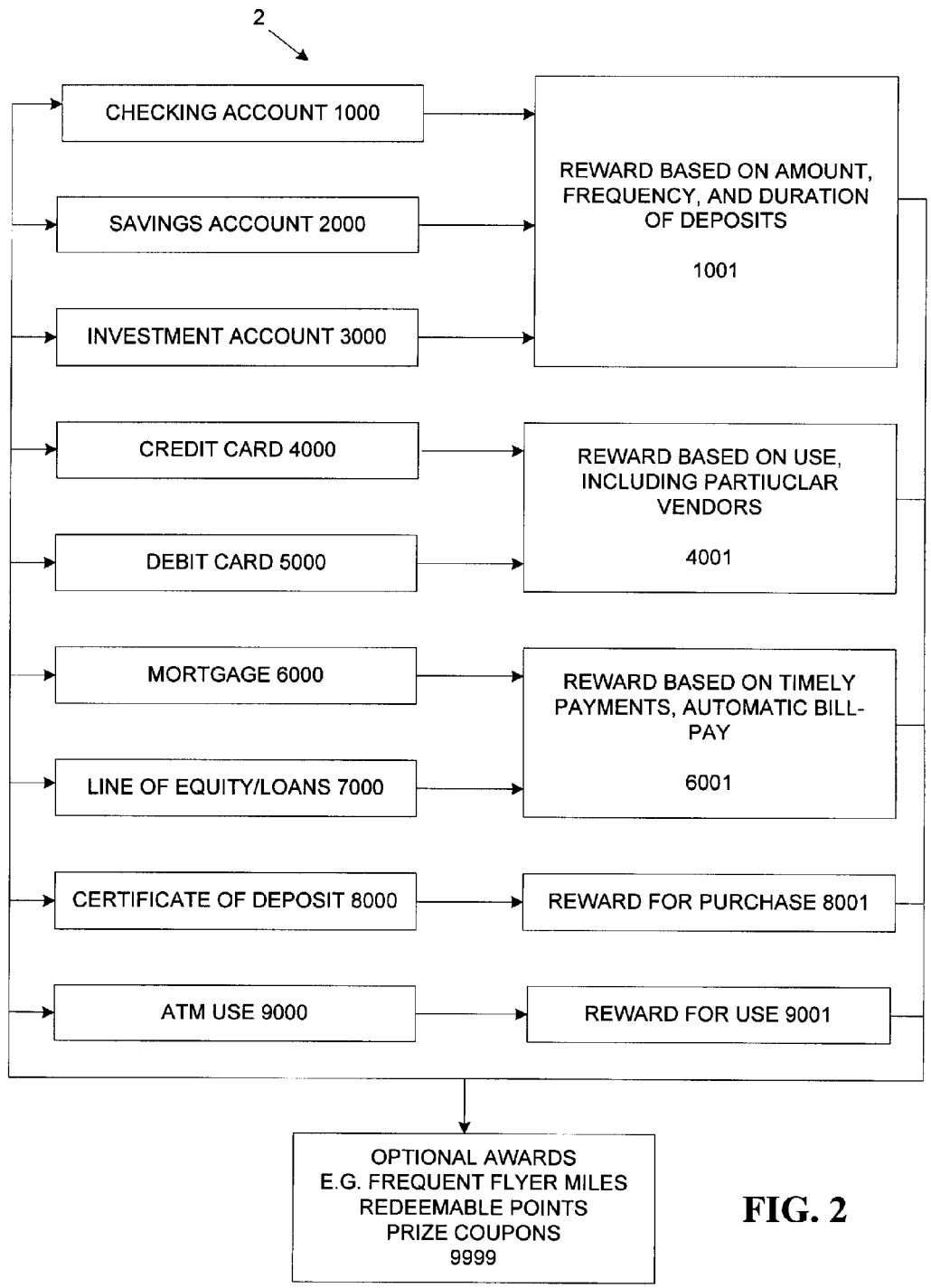
FIG. 2 is a block diagram, illustrating an incentive program in accordance with exemplary embodiments of the present invention.

With reference to FIG. 2, a rewards program 2 in accordance with an embodiment of the present invention will now be discussed. For exemplary purposes, checking accounts 1000, savings accounts 2000, investment accounts 3000, credit cards 4000, debit cards 5000, mortgages 6000, lines of equity/loans 7000, certificate of deposits (CDs) 8000, and ATM use 9000 will be discussed. It is contemplated, however, that any of the panoply of financial transactions available at a Bank may generate rewards.

A customer 10 may partake in any of these financial services. Use of these services may generate rewards which may impact any other financial service that the customer 10 uses. For example, in block 1001, rewards may be awarded for the amount of money deposited in a checking 1000, savings 2000, or investment 3000 accounts.

The reward relating to these accounts may, for example, provide reduced rates or increased services for each of these accounts, or it may attempt to drive business to other financial services, by for example, offering a lowered interest rate on personal loans. For example, if the customer deposits more than a threshold amount into his or her checking account on a specified periodic basis, the customer may be entitled to free check printing. Alternatively, in order to cross-sell Bank services, the reward for such deposits in a checking account may be reduced fees for the customer to meet with Bank's financial planners or investment advisors.

Rewards for checking 1000, savings 2000, or investment 3000 accounts may also be awarded for duration of deposits 1002 (i.e., how long deposited funds were left in the account) or frequency of deposits 1003. Additional rewards may be awarded for direct deposit into these accounts 1004, or transfers between these accounts 1005.

With respect to credit cards 4000 and debit cards 5000, rewards may be awarded for use of the credit or debit card 4001. Optionally, enhanced or increased awards may be issued for use of the credit or debit card 4000, 5000 at particular retailers or for particular services 4002. In other words, the Bank may have certain agreements and/or relationships with various third parties. If the customer spends more than a threshold amount at any of these third party locations or retail establishments, the customer may be entitled to a specified amount of points. Additionally, the Bank may seek to encourage the use of certain payment cards over other payment cards through differential rewards. For example, the Bank may provide higher rewards for credit cards 4000 usage than for debit cards 5000 usage because the former is more profitable for the Bank.

With respect to mortgages 6000, rewards may be awarded based on timely payments 6001, payments made by automatic bill-pay 6002, or payments in excess of the amount due 6003. Rewards may also be awarded for obtaining a mortgage, including a second mortgage or a home equity loan. Repeat customers (e.g., customers who have had multiple mortgages with Bank) may also be entitled to rewards based upon their continued use of Bank's services.

With respect to CDs 8000, rewards may be awarded based on the number of CDs purchased 8001. Rewards for CDs 8000 may also be based on the timely redemption of the CDs, or on the number or size of CDs 8000 purchased.

With respect to ATM usage 9000, rewards may be awarded based on the amount of ATM use 9001, with enhanced rewards optional for use of the Bank's ATMs 9002. Rewards and/or points may also be accrued based on the various features of the ATM that the customer uses. For example, in addition to withdrawing funds and checking balances, the customer may be awarded a specified number of points for transferring funds with the ATM, or for purchasing stamps from the ATM.

Figure 3:
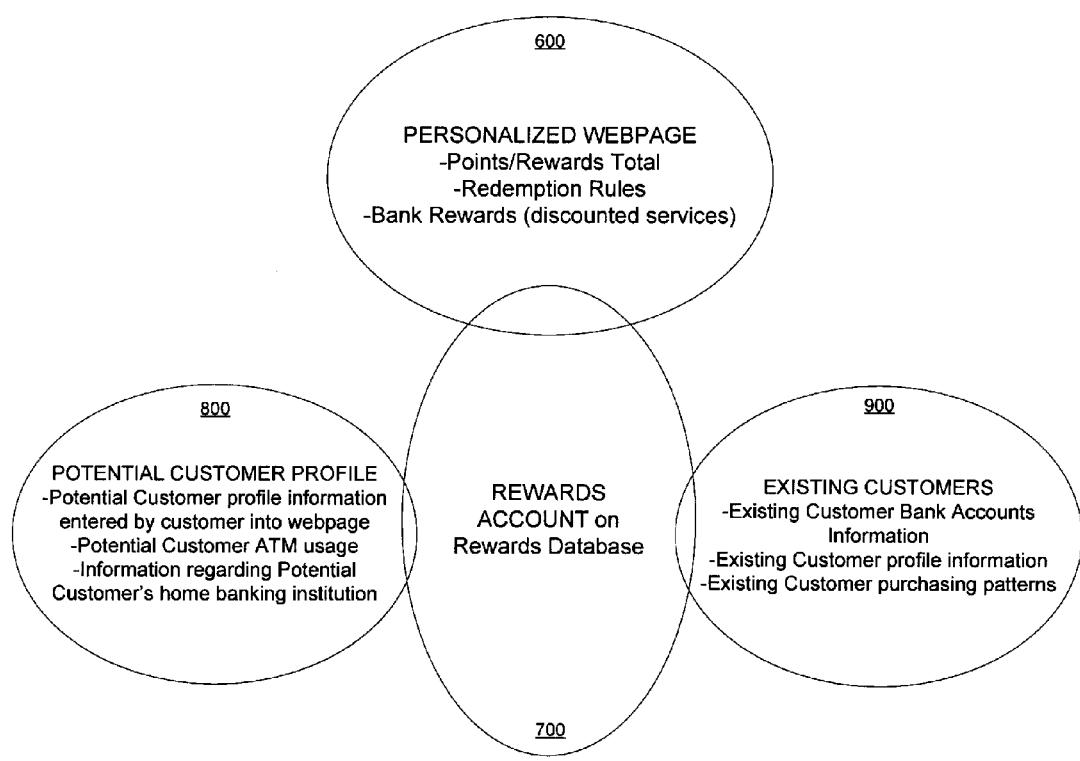
FIG. 3 is a block diagram, illustrating the interaction between a rewards database, customer profile information, and a personalized web page, in accordance with exemplary embodiments of the present invention.

As noted above, the rewards may involve, impact, or encourage other services or accounts that the customer may or may not have at the Bank. In other words, rewards from use of a checking account may result in a reduced mortgage payment one month. Rewards from use of a debit card may result in reduced fees for ATM use. Or, the rewards may be unrelated to financial services. With reference to FIG. 3, a personalized web page 600 may display to the customer information regarding the customer's rewards account from a rewards database 700. For potential customers the personalized web page 600 may also display information from the potential customer's profile 800, such as the potential customer's profile information entered by the potential customer into the personalized web page 600, information regarding the potential customer's use of the Banks services (e.g., ATM service), and information regarding the potential customer's home banking institution, including without limitation the home banking institution's goods, products, services, rates, physical locations, etc. For existing customers, the personalized web page 600 may also display information from the existing customer's profile information 900. The existing customer's profile information 900 may include, without limitation, the existing customer's biographical information known by the Bank, information regarding the existing customer's accounts at the Bank, including without limitation, the existence or lack of existence of all of the aforementioned triggering behaviors.

Both existing and potential customers may have a rewards account maintained on a rewards database 700. This database 700 may also have access to both potential and existing customer profiles 800, 900 in order to provide and tailor rewards and reward redemption rules. The rewards database 700 may also have access to the personalized web page 600, so that any redemption, alterations, or accrual of the potential or existing customer's rewards done via the personalized web page 600 may be recorded in the rewards database 700.

It is the intertwined web of Bank services and awards that may be particularly beneficial to the Bank. The rewards may be contoured to encourage particular customer action (e.g., maintaining funds in a money market account or to use the Bank's ATMs), or simply to reward the customer for using Bank services (e.g., frequent flyer miles, redeemable points). In this manner, the Bank may cross promote its products while also increasing the satisfaction level of the customer.

Rewards Account Functionality

According to exemplary embodiments, methods and systems may permit customers or users to redeem rewards, from a rewards account, at various devices and/or terminals. For example, a customer may redeem rewards balances or points, from a rewards account at an ATM, Interactive Voice Response (IVR), computer, point-of-sale device, mobile device, or other like terminal or interface. Rewards Accounts may be accessed from the device and/or terminal by way of a card or other device which is swiped, inserted, blinked or otherwise interfaced with the terminal and/or device. For example, an Radio Frequency Identification Card (RFID) may be used by the customer at an ATM. The card or other device may use other radio frequency technology than RFID. For example, a device may use Near Field Communication (NFC). According to alternative embodiments, other methods may be used to access the terminal or device. For example, biometrics may be used to access the terminal and/or device. While an ATM and RFID may be used in examples according to exemplary embodiments, this use is meant to be illustrative in nature only and is not meant to limit the invention in any way. It should be understood that the methods and systems described herein are applicable to other terminals and devices as described above.

Upon validation of the customer's identify, the customer may be presented with the option to access his or her rewards account, as well as other accounts the customer may have with an entity that is associated with the terminal and/or device. For example, the customer may be accessing an ATM associated with a financial institution. The customer may have more than one rewards account. The customer may be presented with options to perform certain transactions with the rewards account and/or other accounts. For example, the customer may be given the opportunity to: (1) request a balance inquiry of the rewards balance in the rewards account, (2) withdraw rewards (e.g., redeem cash) from the rewards account, (3) transfer funds from the rewards account, (4) receive virtual rewards, and/or (5) perform other actions.

Customers may be able to set preferences on how the reward account or accounts is to be processed and maintained. For example, the customer may prefer that withdrawal requests give priority to a rewards account if the rewards balance is available for withdrawal before another account, such as a cash or credit account is accessed. In alternative embodiments, preferences may specify how rewards accounts are used and/or processed when transacting with particular merchants. For example, a customer may have a preference to always deduct from a rewards account when visiting a certain coffee shop or spending below a certain threshold. Similarly, the customer may set up transaction processing so that as soon as the customer earns $20 in rewards, the next transaction automatically utilizes the $20 before deducting from a cash or credit account. Rewards balances in the rewards accounts may be accrued according to traditional models and algorithms. For example, card, account and transaction history may be used to determine the accrual of rewards balances.

Other types of rewards may be dispensed from the ATM. The methods and systems for rewards, as described elsewhere in this application may be used with the methods and systems for accessing a rewards account. For example, a certificate for a free product or service, a movie ticket, a redeemable coupon, or any other coupon or promotional item may be dispensed by the ATM upon completion of the transaction. The reward may be dispensed as part of the receipt for the transaction. For example, the reward may be printed on the receipt, such as on the back of the receipt, or a coupon and/or voucher, with redemption instructions, may be attached to the receipt. The reward may be provided in an electronic form to the customer. For example, the reward may be provided as an email and/or text message. In alternative embodiments, the reward may be dispensed separately from the receipt for the transaction.

The transaction does not have to be a financial transaction. For example, upon checking in at an airline kiosk, such as at an airport, before a flight, a user may be presented with a free drink coupon to be redeemed on the plane or the user may be provided with the opportunity to check additional baggage at no charge in the form of a voucher or coupon. The coupon may be dispensed from the kiosk as a separate item. According to alternative embodiments, the coupon or voucher may be provided to the user in electronic form, such as an email and/or text message. The electronic form may be sent to a personal electronic device. For example, the coupon or voucher may be sent to a personal data assistant or cell phone associated with the user. The user may be presented with options to print a physical copy of the coupon from the electronic form. For example, a station, either located with or separate from the kiosk, may be provided which may allow the user to print out the reward and/or coupon. At such a station, a user may use the personal electronic device to interface with the station in order to print out the reward and/or coupon. The personal electronic device with the electronic form of the voucher or coupon contained therein may be used to redeem the reward. For example, the coupon may be a bar code contained in the electronic form. The user may present the personal electronic device, with the bar code displayed on the screen, to an appropriate scanner. The scanner may read the bar code from the personal electronic device in order to provide redemption of the reward from the coupon. For example, the user may have received a coupon for free luggage check-in. The coupon may be electronically contained within the user's cell phone. The user may present the cell phone at the luggage check-in counter to a scanner with the bar code displayed on the screen of the cell phone. The scanner may then read the bar code from the personal electronic device. According to exemplary embodiments, the airline kiosk may access the user's rewards account to determination eligibility and appropriate rewards for the user. Similar scenarios are possible with other third party vendors, such as hotels, retail/merchants, restaurants, gas stations, car rental agencies, etc. It should be appreciated that the methods and systems may be applied outside of the traditional ATM at a financial institution concept, as illustrated by the preceding example.

According to exemplary embodiments, virtual rewards may be dispensed from the interface. The virtual reward may be an indicia upon the receipt. The indicia may be a bar code, a voucher number, a confirmation code, or other similar number and/or code imprinted upon the receipt. The receipt, with the indicia thereon, may be presented for redemption. The receipt and the indicia may be required for redemption. The presentation may occur at the financial institution, a merchant, or other similar entity. Upon presentation, the entity may present the customer with their reward. The virtual reward may represent various award types, including, but not limited to, stored value, cash value, and/or a physical item. For example, the customer may receive a receipt with a bar code printed thereon that entitles them to a free cup of coffee at a local coffee shop. The customer may configure rewards preferences for the type of reward received. The customer may further be able to enter personal preferences which may be used to determine the type of rewards received by the customer. For example, the customer may enter that they drink coffee and prefer a certain type or brand of coffee. The system may use these preferences in determining rewards to be dispensed, such as the virtual rewards.

According to exemplary embodiments, rewards may be transferred as a gift to another individual. The gift may be in a variety of forms. For example, an individual's email address may be used to communicate a gift, such as rewards points or cash from converted rewards points, from the rewards account, to the individual. Alternatively, rewards balances may be converted into a gift card or stored value card for use with a particular transaction network or merchant. Preferences may be configured so that any earned rewards are automatically sent to one or more predetermined individuals. For example, a preference may be configured to give half a reward to child A and the other half to child B.

The user may be presented with a listing at the terminal and/or device which displays a list of goods or services the user can redeem rewards for. The listing may be similar to a catalog listing or may be similar to a web site with interactive links. The listing may allow user interaction to complete transactions or other functions and/or tasks related to the list and/or the rewards account. The listing may be a web site and may be communicatively coupled with the internet. For example, the user may be able to book travel, load up reward cards with earned points, and other similar functionality that the user is currently able to do by accessing the rewards site via the Internet.

According to exemplary embodiments, rewards may be redeemed to an RFID card and/or other RFID device. The rewards may be converted to value and stored upon the RFID card and/or other RFID device. A rewards balance may be transferred to an RFID card for portability purposes. For example, a customer may use an RFID card to access the interface. The customer may present a RFID card at an ATM for access. Upon validation of the customer and accounts associated with the customer, the customer may be offered the opportunity to redeem rewards. For redemption of the rewards, an option may be presented to the customer to transfer the rewards to the RFID card. For example, the RFID card may have stored value capability. The customer may redeem an amount of rewards points from their available rewards balance. The redemption may involve transfer of the value of the rewards points, based on a conversion rate, to the RFID card and stored therein for later use. For example, the RFID card and/or other RFID device may be presented at an appropriate point of sale to complete a transaction. For example, the customer may make a purchase at a merchant and present the RFID card and/or other RFID device at the point of sale device. The point of sale device may read the RFID information and process the transaction accordingly, debiting the stored value amount contained on the card. In alternative embodiments, the customer may redeem the rewards to a second card which is different from the card used to access the interface. For example, the customer may use a RFID card to access an ATM and then redeem the rewards to a second card, such as a RFID transit card. The customer's rewards balance and other information may be stored on an RFID chip. Such information may be accessed by the terminal and/or interface. The customer may therefore have portability with their rewards account.

Figure 4:
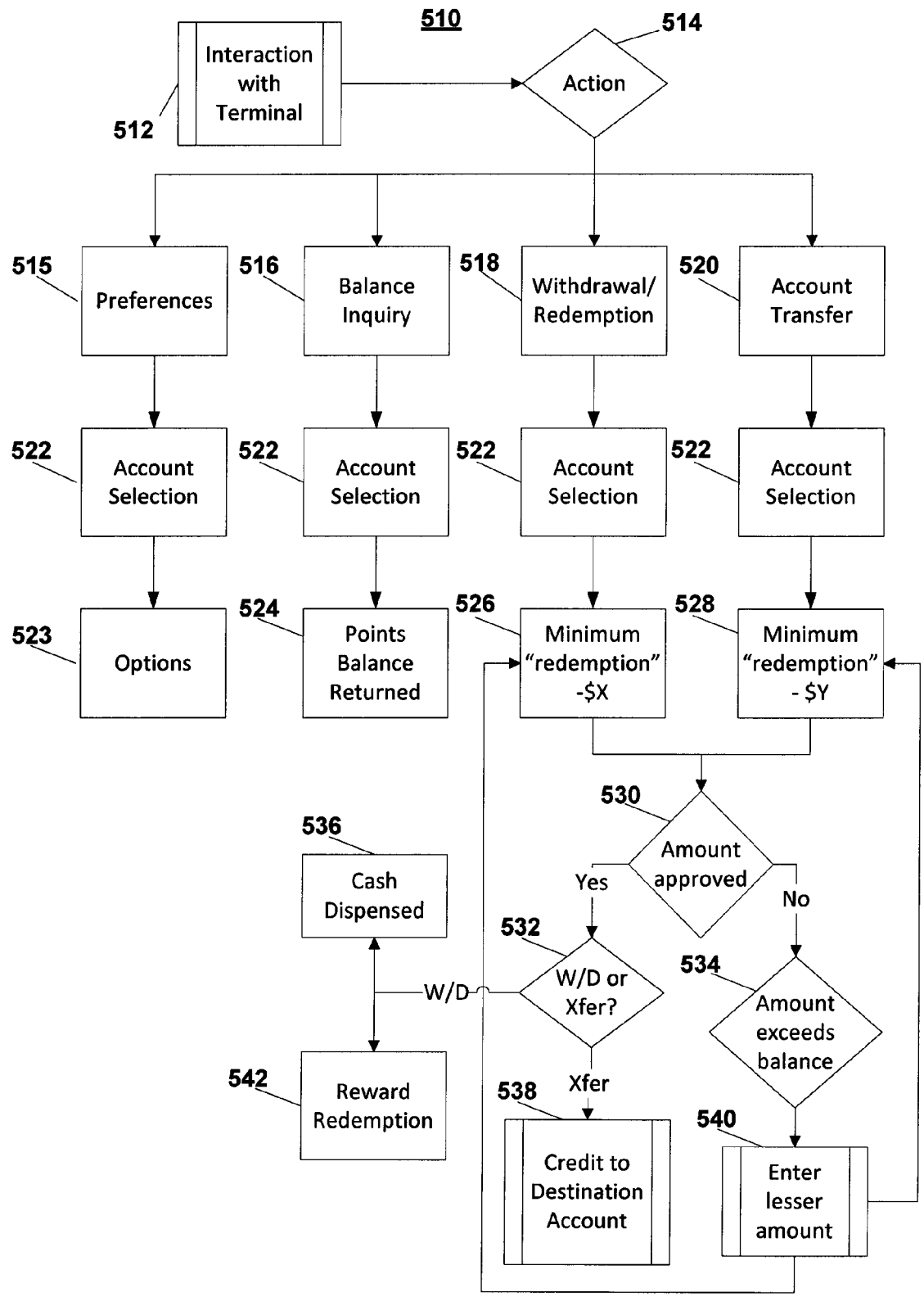
FIG. 4 is a basic flowchart of a method of accessing a rewards balance at an interface in accordance with exemplary embodiments of the present invention.

FIG. 4 depicts a flow chart of a method of accessing a rewards account according to an exemplary embodiment. Exemplary method 510 is provided by way of example, as there are a variety of ways to carry out the methods disclosed herein. The method 510 as shown in FIG. 4 may be executed or otherwise performed by one or a combination of various systems, such as a computer implemented system. The computer implemented system may be connected to a computer based network. Each block shown in FIG. 4 represents one or more processes, methods, and/or subroutines carried out in the exemplary method 510. Each block may have an associated processing machine or computer, or the blocks depicted may be carried out through one processor machine. Input may be desired from a consumer or user during various parts of the below described method, the input may be accomplished through a user interface. Referring to FIG. 4, the exemplary method 510 may begin at block 512. At block 512, a an interaction with a terminal is initiated. At block 514, an action is selected by the customer. At blocks 515, 516, 518, and 520, the actions may include preferences, a balance inquiry, a withdrawal/redemption, and an account transfer. At block 522, the customer may select a rewards account with a rewards balance. At block 523, options are presented. At block 524, a points balance of the rewards account is returned. At blocks 526 and 528, a minimum redemption value is displayed. At block 530, an amount approval query is performed. At block 532, the type of transaction, withdrawal or account transfer is determined. At block 534, an amount exceeds balance warning is displayed. At block 536, currency is dispensed to the customer. At block 538, the destination account is credited. At block 540, a lessor amount is requested. At block 542, rewards are redeemed. These steps will be described in greater detail below.

While FIG. 4 illustrates certain steps performed in a particular order, it should be understood that the embodiments of the present invention may be practiced by adding one or more steps to the processes, omitting steps within the processes and/or altering the order in which one or more steps are performed. Furthermore, certain examples may be provided of exemplary embodiments which may use certain dollar and/or reward amounts. These example are not meant to be limiting in any way upon the exemplary embodiments. Other dollar and/or reward amounts are capable of being selected and used in accordance with exemplary embodiments.

At block 512, a customer initiates an interaction. The interaction may be with an terminal and/or interface. The terminal and/or interface may be accessed. For example, the terminal or device may be an ATM, an IVR, a computer, a point-of-sale device, a mobile electronic device, or other like terminal or interface. For illustrative purposes only, an ATM will be used as an exemplary terminal. However, the methods described herein are equally applicable to other terminals and/or devices. For example, the method described herein may be used with a personal computer connected to a computer network, such as the internet or a local area network, and for accessing a designated site or website to implement embodiments of the present invention.

The interaction may be initiated through the use of a card or other device. The transaction may involve conducting any type of interaction with the terminal and/or interface. For example, the customer may approach an ATM and present their ATM card to the ATM. It should be appreciated that a credit and/or debit card may be used to access an ATM or other terminal and/or interface, such that the credit and/or debit card may serve the function of an ATM card. In some embodiments, the presentation of the card may involve physically inserting the card into the ATM or swiping the card at the ATM. For example, the ATM card may be inserted into or swiped through a designated slot located on the ATM. In alternative embodiments, the customer may present the card to the ATM in a manner that does not involve the physical insertion of the card into the ATM. For example, the ATM card may use RFID technology. Such an RFID ATM card may be presented by passing or swiping the ATM card over a designated area upon or near the ATM. It should be appreciated that other types of presenting the card or other device are known and may be used. It should further be appreciated that other devices may be used in place of a card. For example, a key fob may be used, or biometrics, such as fingerprints or retinal scan, may be used. In other embodiments, the customer may enter a code into a keypad or like device in conjunction with or in lieu of using a separate device or card.

Once the required device or card is presented to the terminal and/or interface, information may be read from or otherwise accessed from the device or card. This information may be used to validate and/or identify the customer. For example, when a customer presents their ATM card to the ATM, the account information contained thereon may be used to validate the identity of the customer and acknowledge that they are a customer of the bank that is associated with the ATM. According to some embodiments, the customer may be required to enter a code into the terminal and/or interface as a further means of verifying the customer's identity. Such codes may be used to prevent fraud. For example, the customer, following presentation of the ATM card, may be required to enter a Personal Identification Number (PIN) at the ATM.

The customer may be an existing customer or a potential customer, as described above. It should be appreciated that the terminal and/or interface may be associated with a particular financial institution, such as a bank, or a particular ATM network. Following the validation of the customer, the terminal and/or interface may present certain options to the customer. These options may include particular actions as described below. The options presented to the customer may be dependent upon the customer's status as an existing or a potential customer. In accordance with some embodiments, the type of terminal and/or interface may influence the options presented to the customer. For example, not all ATMs associated with a particular bank or ATM network may offer the method herein described. According to alternative embodiments, a potential customer may be presented with incentives to become an existing customer at the particular financial institution. For example, a potential customer may access a terminal and/or interface associated with a particular financial institution. The interface may be an ATM. Upon validation of the potential customer's identity and validation of the fact that they are not an existing customer of the financial institution, a message may be displayed to the potential customer offering them an incentive to open an account or perform some other action with the financial institution. For example, the potential customer may be offered a rewards balance to open an account. A physical or virtual reward, as described herein, may be offered to the potential customer. The incentive may be printed upon a receipt for the potential customer as a record thereof and also for redemption. Instructions on redemption may be provided on the receipt or on the terminal display. The incentive offered may be provided to the potential customer in electronic form, such as an email and/or text message. In order to provide such an electronic form, the potential customer may be asked for electronic address information. For example, the potential customer may be asked to provide an email address and/or cellular telephone number.

At block 514, an action is selected at the terminal and/or interface by the customer. The action may be one or more of any number of transactions that may be performed at the terminal and/or interface. The actions may be presented to the customer on a display screen of the terminal and/or interface. The customer may select the desired action from one or more menus of choices as presented. For example, actions may include preferences, balance inquiry, withdrawal, and account transfer. These actions are shown by blocks 515, 516, 518, and 520, respectively. This listing of actions is meant to be exemplary only and is not meant to be limiting. Selection of the action may be completed by actuating a button located upon the terminal and/or interface and corresponding to the desired action. The button may be a physical button, such as on a keyboard or keypad. The button may be a virtual button located upon a touch screen. It should be appreciated that other selection methods are possible.

At block 522, following the action selection following block 514 at blocks 515, 516, 518, or 520, the customer may be required to select an account to perform the action upon. A list of the customer's accounts may be displayed for the customer to select from. The customer may have one or more available accounts to select from. For example, the customer may have two accounts associated with the bank or the ATM card, these two accounts may be a checking and a savings account. The customer may have other accounts beyond checking and savings accounts, such as other deposit accounts and/or loan accounts. For example, the customer may have a loan account with an outstanding loan balance. These other accounts may be presented to the customer to perform the selected actions upon. The customer may be presented options corresponding to those accounts. In accordance with exemplary embodiments, the customer may have one or more a rewards accounts. For exemplary purposes only, the customer will be assumed to have one rewards account. It should be appreciated that the customer may have multiple rewards accounts based on their customer's participation in one or more eligible rewards programs with the financial institution.

According to alternative embodiments, the rewards program may be managed by or associated with an entity other than a financial institution. The entity may be a merchant or service provider. The entity may offer customers a rewards program. Customers may enroll in the program. The rewards account associated with that rewards program may be accessed through the terminal and/or interface as described herein. Customers may accumulate or accrue a rewards balance through the purchases or other interaction with the entity. For example, for every $1 spent at a merchant, the customer may accrue 1 reward point. Other such programs are possible, as should be appreciated.

The rewards account may have a balance of rewards points or other content. The rewards balance may be presented as an option to select and perform actions upon, along with the customer's other accounts, as described above. For example, the customer may select a withdrawal option at block 518. Following selection of that option, a list of available accounts may be presented to the customer, the list may include a rewards account. The customer may select the rewards account.

According to alternative embodiments, the account selection may occur prior to block 514. That is, block 522 may be performed prior to block 514. For example, the customer, following validation, may be presented with a listing of available accounts. The account listing may include a rewards account as described above. The customer may then select an account and then be presented with a listing of actions to perform on the selected account.

If the customer is at a non-eligible terminal and/or interface, or the customer is not a customer associated with the financial institution, such as a potential customer, or other entity, then the rewards account may not be presented as an option to the customer. For example, the customer may be at a non-eligible ATM. A non-eligible ATM may be an ATM that is managed by a financial institution other than the customer's financial institution. The non-eligible ATM may be part of an ATM network that is not used by the customer's financial institution. If the customer is a potential customer, the potential customer may not have a rewards account with the financial institution. In accordance with some embodiments, a potential customer may have a rewards account established based on their interaction with and transactions conducted with a particular ATM or a particular financial institution. The rewards account for the potential customer may be available only to the potential customer at a particular ATM or a particular branch of the financial institution.

It should be further appreciated that the customer may select more than one action and/or more than one account. For example, upon completion of the steps for one action, as described below, the customer may be offered a choice to select another action or transaction to perform. In this manner, the customer may perform multiple actions at the ATM after the single presentment of their ATM card.

At block 523, following the preferences selection, options are presented. The options may be associated with the preferences for the selected account from block 522. The rewards account may have preferences associated therewith. The preferences may relate to the functioning of the rewards account.

For example, the customer may be able to define rules relating to the rewards balance, such as giving one rewards account priority over a second rewards account. Rewards accounts may be given priority over other accounts for certain transactions.

The rewards account may be automated to perform a certain action at a set rewards balance level. For example, the customer may configure transaction processing such that as soon as $50 in rewards are earned, said rewards are automatically transferred to the customer's checking account. By way of another example, a customer may configure transaction processing such that as soon as $100 in rewards are earned, said rewards are automatically transferred to and applied against an outstanding loan balance. Other rules may allow a customer to configure the account with respect to the minimum redemption values described herein. Such rules may allow a customer to conduct the action desired despite having a rewards balance below the minimum redemption value. For example, if the minimum redemption value is $10, and the customer's rewards balance is only $5, a rule may be configured allowing the $5 to be debited to the customer's rewards account and the remaining $5 to be withdrawn from the customer's savings account. The customer may specify amount limits and particular accounts for processing the actions against. Similar rules may be configured for actions exceeding the rewards balance.

The rewards account may be configured to specify use of the rewards account for debiting when conducting transactions with particular vendors or merchants or if spending a certain threshold amount of money. This configuration may be used with rewards accounts associated with certain merchants. In alternative embodiments, the rewards account may be used with the customer's transaction, credit, charge, debit, and/or check card. For example, the customer may set a rule that all transactions under $20 at coffee shop X are to be debited against the rewards account prior to the checking account. The customer may configure preferences for the type of reward and/or personal preferences that may be used in determining the reward type.

At block 524, following the balance inquiry action, a points balance is returned to the customer. The points balance may reflect the eligible rewards points in the rewards account. The eligible points may be those that the customer may use at the present time. It should be appreciated that the eligible balance may be less than the overall rewards points depending on the terms and conditions of the rewards account and/or program. The customer may be presented with both an eligible balance and a total balance. For example, the customer may be presented, on the ATM display, a listing of the points balance associated with the rewards account. Additional detail may be provided to the customer such as previous points redeemed and/or a history associated with the rewards account. A conversion rate, if applicable, for converting the points into currency may be presented to the customer. For example, the conversion rate of 1 point=$1 may be displayed. It should be appreciated that other such conversion rates may be used. For example, the conversion rate may be 2 points=$1, 5 points=$1, 10 points=$1, or 100 points=$1. The conversion rates used in the preceding examples are exemplary only and are not meant to limit the exemplary embodiments. It should be further appreciated that some rewards accounts may use a monetary type balance to represent the rewards balance so no conversion is required. For example, $1 in the rewards account may be equivalent to $1 in actual currency. According to alternative embodiments, a conversion rate of rewards points to rewards may be displayed. For example, a conversion rate of 200 points for a $50 gift card or debit card may be displayed. The conversion rate may correspond to a listing of rewards as described below. It should be appreciated that other conversion rates are possible.

In accordance with some embodiments, the rewards balance may be printed onto receipts issued from the terminal and/or interface. The rewards balance may be printed on the receipt regardless of whether an action was performed upon the rewards account. For example, the customer's ATM receipt may have the rewards balance printed on it if the customer withdrew funds from their checking account. The printing of the rewards balance upon the customer's receipt may be controlled through preferences which are modifiable by the customer. Such preferences may be managed through selections from a menu at the terminal and/or interface. For example, the customer may desire to not have the rewards balance printed on every ATM receipt, so they may toggle an appropriate option at the ATM. In alternative embodiments, the ATM preferences may be managed through a website accessible through the internet. According to some embodiments, the customer may not receive a receipt. Instead, an email or other electronic communication may be sent to the customer as a record of the transaction. It should be understood that some terminals and/or interfaces may not have the capability to generate a printed receipt. Further, the customer may desire an electronic record of the transaction or other account activity. The customer may be presented preferences to select and configure such options.

At blocks 526 and 528, following selection of the withdrawal/redemption or account transfer action, a minimum redemption value may be presented. At minimum redemption may be required to perform the withdrawal or transfer. That is, the customer may be required to conduct a certain minimum value transaction to perform these options. The minimum value transaction may be presented to the customer in the form of currency value and/or rewards point value. The minimum value may be displayed upon the terminal and/or interface display. The minimum redemption value may be different for withdrawals and transfers. The customer may be presented with the rewards balance of their rewards account, as described for the balance inquiry, when withdrawal or account transfer is selected. Displaying the rewards balance may assist the customer in completing the transaction.

The customer may be prompted to confirm that they want to continue with the withdrawal or transfer. In some embodiments, if the customer's reward account point balance is insufficient to meet the minimum value, the customer may receive an appropriate message on the display and be prompted to selected another action. For example, if the customer has selected withdrawal at block 518, at block 526, a message indicating that the minimum redemption required is $20. The customer may be asked to confirm that they understand this requirement by selecting an appropriate response, such as "yes" or "no". The customer may then be required to input an amount, over the minimum redemption value, to either withdraw or transfer, to complete the selected action. Such an input may be performed by the customer at the terminal and/or interface. For example, the customer may enter the amount using a keypad on the ATM. According to alternative embodiments, as described above, the customer may configure rules to allow transaction processing to continue even if the rewards balance is insufficient or the customer has entered an amount over their rewards balance. The customer may be presented with a confirmation that they wish to proceed with the transaction and apply the pre-configured rule from block 523.

In the case of an account transfer, the customer is required to select a destination account for the transfer. The customer may be provided with a list of eligible accounts to which the transfer may be performed. For example, the customer may select a checking, savings, or loan account as the destination account for the transfer from the rewards account. The account transfer may be performed to a second rewards account. The account transfer may be performed to an account not associated with the customer. That is, an account transfer may be performed to a third party, including a rewards account associated with the third party. The customer may be required to enter the destination account information. For example, the customer may choose an account transfer to an account not listed. The customer may be required to enter the account information for that account, such as the account number and/or routing number. In alternative embodiments, the customer may be able to email the rewards transfer to a third party by entering the individual's email address. The individual may receive an email indicating how to redeem the rewards transferred. A text message or email may be sent to the customer's cellular phone or a personal electronic device, such as a personal data assistant. A combination of an email and a text message may be sent, such that the customer may receive multiple electronic communications regarding the redemption. In alternative embodiments, the individual receiving the transferred points may receive a notification from the financial institution announcing the transfer.

Further, the transfer to a third party may be made in various alternative forms, beyond a transfer of rewards balance or cash value. For example, the transfer may be made in cash, gift card or certificate, stored value card, or other tangible form. The transfer may be made in intangible form. For example, the transfer may be a virtual reward. An illustrative example will be provided. A customer desires to perform an account transfer of $10 in rewards balance to the customer's child. The customer interacts with the terminal and accesses their rewards account. Following selection of the rewards account and account transfer action, as described above, the customer may be presented with transfer options. A transfer to third party option may be presented. The customer may select that option. Subsequent options may be presented, including selection of the form of transfer. A form of transfer may emailing and/or texting a voucher for a gift card to the third party, in this case, the child. The customer may enter the child's email address and/or text address. The child may then receive an email and/or text message with a voucher for the gift card with instructions on how to redeem the voucher to receive the actual gift card with $10 on it. The customer's account may be appropriately debited for the transaction as described herein. It should be appreciated that the gift card may be for cash value at a merchant associated with the rewards account or for value for services from said merchant. The gift card may simply be a transaction card, such as a debit card, loaded with $10 for use at any merchant which accepts such transaction cards. According to alternative embodiments, the transfer may be a combination of a gift card and virtual reward, or a virtual reward. Preferences may be configured by the customer regarding to form of the transfer.

At block 530, the amount is approved. If the amount is approved, the method 510 continues at block 532. If the amount is not approved, then the method 510 continues at block 534.

At block 532, the next action depends on whether the transaction is a withdrawal ("W/D") or a transfer ("Xfer"). If the transaction is a withdrawal, then cash may be dispensed from the terminal and/or interface, such as an ATM, in an appropriate currency as shown at block 536 or a redemption of rewards occurs at block 542. The withdrawal may be something other than a cash withdrawal. For example, the withdrawal may be virtual gift card. If the transaction is a transfer, then the transfer amount is credited to the desired destination account as shown at block 538. In either case, the rewards account may be debited an appropriate amount following completion of the transaction or simultaneously with the transaction. For example, if the customer has chosen to withdraw $100 from the ATM, and that withdrawal equates to 100 points, then the customer will receive $100 from the ATM and the rewards account will decrease by 100 points. In alternative embodiments, the withdrawal of $100 may require more than 100 points, based on the conversion rate. For example, the $100 withdrawal may require 200 points at a 2 points=$1 conversion rate or 500 points at a 5 points=$1 conversion rate. Likewise, the rewards account will be debited to cover the amount transferred to an account.

It should be appreciated that some transactions conducted at certain terminals and/or interfaces may have a fee imposed upon them. Such a fee may be debited against the rewards account in an appropriate number of points to cover the liability. For example, certain financial institutions may charge a fee for using their ATMs. In some embodiments, the customer may elect to have such fees paid from another account by setting an appropriate preference.

At block 534, the amount selected to be withdrawn or transferred exceeds the available point balance. An appropriate message may be displayed to the customer. At block 540, the customer is prompted to enter a lessor amount. The method 510, as shown, returns to either block 526 or 528, as appropriate.

According to exemplary embodiments, the customer may be presented with a listing of available rewards during the transaction with the terminal and/or interface. This listing may be presented to the customer in various places during the transaction. For example, the customer may be presented with the rewards listing under the options of block 523 or as part of a withdrawal at blocks 526 or 536. For the withdrawal action, the customer may be presented with an option to redeem the points for a reward instead of receiving cash or currency. The customer may still receive a minimum redemption value message as described above for block 526. For the options, the customer may be able to select and browse a listing of available rewards. While browsing, the customer may be presented with an option to select and reward and redeem rewards points to get that reward.

Upon selecting the redemption for a reward, the customer may be presented with a reward listing. For example, a listing of available rewards may be listing in the form of a catalog. The listing may be tailored to the customer based on previous preferences for rewards and/or the available rewards balance. The customer may select a desired reward. Upon selection, the customer's rewards account may be debited appropriately, as described above for withdrawal of cash. It should be appreciated that the listing of rewards may encompass a variety of tangible items and/or intangible rewards. For example, the rewards may include booking travel, gift cards, stored value cards, reloading of stored value cards, a virtual reward for a cup of coffee, a virtual reward for a discount at a local merchant, a coupon, and other similar rewards. Such functionality and rewards may be similar to those that a customer may perform by accessing an internet based web site. According to alternative embodiments, the terminal and/or interface may be configured to access the internet during the transaction to provide the rewards listing and complete the transaction.

The reward redemption may occur at block 542. The customer may receive a tracking number and/or a confirmation number confirming the reward. Instructions on redemption may be provided. Alternatively, the terminal and/or interface may dispense or print a voucher and/or receipt for the transaction indicating the reward redemption. The actual reward may be dispensed. For example, a virtual reward in the form of a bar code or other indicia may be printed on the receipt. The bar code representing the virtual reward in the form of stored value. The customer may then take the receipt to an appropriate location and perform the redemption. A coupon or gift and/or stored value card may be dispensed. The customer may receive an electronic communication regarding the reward redemption. For example, an email and/or text message regarding the reward redemption may be transmitted to the customer. The electronic communication may confirm the reward redemption. The electronic communication may contain the reward. For example, the email and/or text message may contain the bar code or other indicia required to redeem the reward. The customer may configure preferences as described above regarding the notification process for reward redemption. The reward may be redeemed through the transfer to a RFID card, as described above.

According to exemplary embodiments, the method 510 may include the methods described in the present application regarding the "golden ticket" and also may include the methods described in the related applications. Rewards, random or otherwise, may be dispensed to the customer upon completion of the transaction as herein described.

Figure 5:
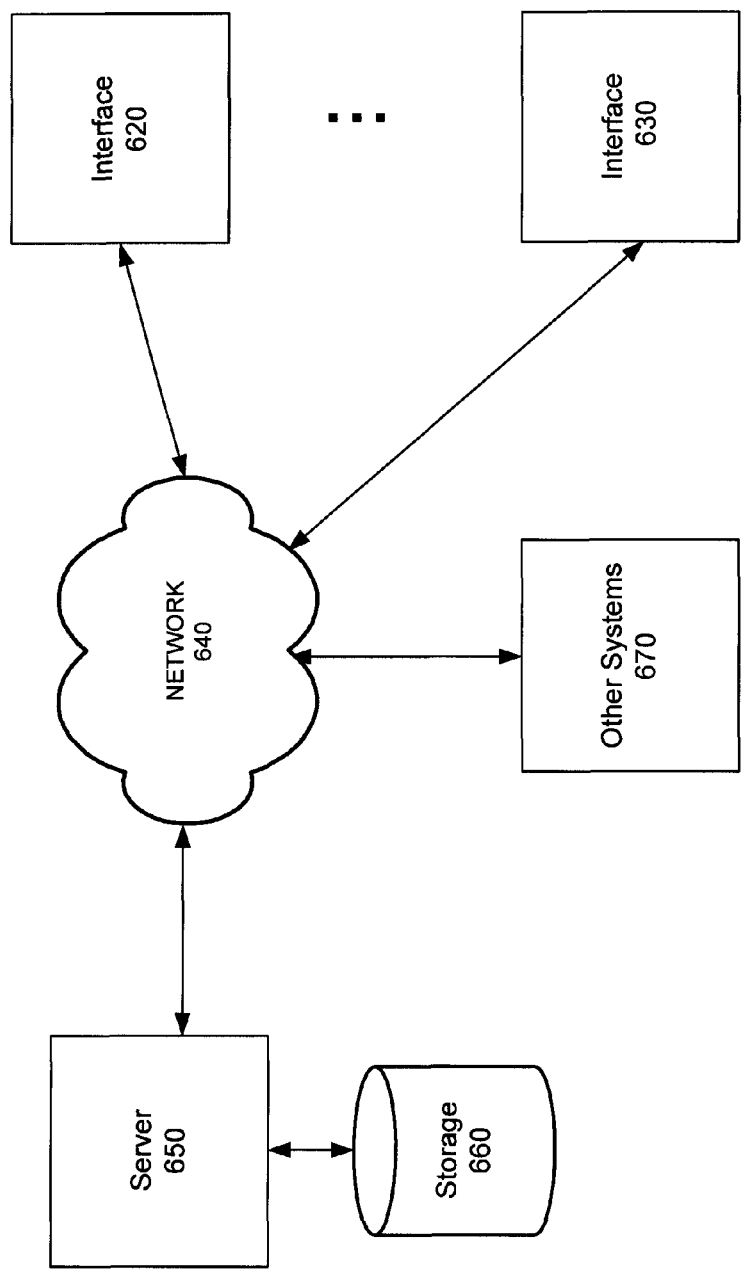
FIG. 5 is a system for accessing a rewards balance at an interface in accordance with exemplary embodiments of the present invention.

FIG. 5 is a system for accessing a rewards balance according to an exemplary embodiment of the present invention. System 610 may provide various functionality and features associated with execution optimization. More specifically, system 610 may include an interface 610 and an Nth interface 630, a network 640, a server 650, a database 660, and other systems 670. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. For example, some of the modules or functionality associated with the modules may be supported by a separate application or platform. Other implementations and architectures may be realized. It should be appreciated that system 610 may be integrated into and run on a computer, such as a general purpose computer which may include a processing machine which has one or more processors. Such a processing machine may execute instructions stored in a memory to process the data. System 610 may be integrated into and run on one or more computer networks which may each have one of more computers associated therewith.

As noted above, the processing machine executes the instructions that are stored in the memory or memories to process data. This processing of data may be in response to commands by a user or users of the processing machine, in response to previous processing, in response to a request by another processing machine and/or any other input, for example. As described herein, a module performing functionality may comprise a processor and vice-versa.

According to exemplary embodiments, the system 610 may be configured to carry out the method 510 as described above. The system 610 may have an interface 620 associated therewith. An Nth interface 630 may be further associated with the system 610. The interfaces 620 and 630 may each be an ATM or other interface/device, such as a personal computer or a mobile electronic device. Each interface 620 and 530 may include software and/or modules to implement the method 510 according to exemplary embodiments. Each interface 620 and 630 may provide processing, display, storage, communications, and execution of commands in response to inputs from a user thereof and respond to requests from the software and/or modules. The interfaces 620 and 630 may be configured to perform other functions and processing beyond the method 510. That is, the interfaces 620 and 630 may be multi-functional in operation.

The interfaces 620 and 630 may be communicatively coupled to a network 640. Network 640 may be a computer based network, comprising one or more servers and/or computer processors. For example, network 640 may be the internet. Information and data may be exchanged through the network 640 between the various components of the system 610. In alternative embodiments, the network 640 may be a local area network within a financial institution. It should be appreciated that the network 640 may be a combination of local area networks, wide area networks, and external networks.

The server 650 may be communicatively coupled to the network 640. The server 650 may consist of one or more servers and/or general purpose computers, each having one or more computer processors associated therewith. The server 650 may perform operations associated with the methods accordingly to exemplary embodiments. The server 650 may have storage 660 communicatively coupled thereto.

The storage 660 may consist of one of more data storage devices. The storage 660 may be local, remote, or a combination thereof with respect to the server 650. The storage 660 may utilize a redundant array of disks (RAID), striped disks, hot spare disks, tape, disk, or other computer accessible storage. In one or more embodiments, the storage 660 may be a storage area network (SAN), an Internet small computer systems interface (iSCSI) SAN, a Fibre Channel SAN, a common Internet File System (CIFS), network attached storage (NAS), or a network file system (NFS). The storage 660 may have back-up capability built-in or communicatively coupled. The back-up capability of the storage may be used to archive data for later use. The back-up capability may be used for recovery of data in the event of a failure of the storage.

Communications with the storage 660 may be over a network, such as the network 640, or communications may be over a direct connection between the storage 660 and the server 650, as depicted in FIG. 5. Data may be transmitted and/or received from the storage 660. Data transmission and receipt may utilize cabled network or telecom connections such as an Ethernet RJ45/Category 5 Ethernet connection, a fiber connection, a traditional phone wireline connection, a cable connection or other wired network connection. A wireless network may be used for the transmission and receipt of data.

The system 610 may have other systems 670 associated therewith. These other systems 670 may include various data collection and support systems used by financial institution or other entity associated with the systems and methods described herein.

The embodiments of the present invention are not to be limited in scope by the specific embodiments described herein. For example, although many of the embodiments disclosed herein have been described with reference to banks and credit card purchases, the principles herein are equally applicable to any reward account managed by any entity and any customer behavior and/or qualifying criteria.

Indeed, various modifications of the embodiments of the present inventions, in addition to those described herein, will be apparent to those of ordinary skill in the art from the foregoing description and accompanying drawings. Thus, such modifications are intended to fall within the scope of the following appended claims.

Further, although some embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes.

Accordingly, the claims set forth below should be construed in view of the full breadth and spirit of the embodiments of the present inventions as disclosed herein.

What is claimed is:

1. A computer-implemented method for accessing a rewards account comprising:
    receiving an interaction from a customer, wherein the interaction is received via an interface associated with a financial institution and comprises at least identifying information which identifies the customer;
    determining, by at least one computer processor, a customer status comprising determining whether the customer is an existing customer or a potential customer of the financial institution, wherein the existing customer is a present account-holder with the financial institution and the potential customer is not a present account-holder with the financial institution;
    determining, by the at least one computer processor, one or more accounts associated with the customer, wherein the computer processor determines the one or more accounts based on the identity of the customer and the customer status and the one or more accounts comprise at least a rewards account with a rewards balance associated therewith;
    receiving an action selection from the customer wherein the action selection is selected from a presented list of one or more available actions presented based on the customer status;
    receiving an account selection from the one or more available accounts; and
    performing, by the at least one computer processor, the action selection upon the account selection; and
    dispensing a receipt upon completion of the action performance,
    wherein the receipt comprises an indicia of a reward, the reward being dispensed to the customer based on one or more preferences pre-determined by the customer.

2. The method of claim 1, wherein the one or more actions comprise, for an existing customer: a balance inquiry, a withdrawal action, an account transfer, and preference configuration and the one or more actions comprise, for a potential customer, options to open an account with a rewards account associated therewith.

3. The method of claim 2, further comprising:
    receiving the action selection of the balance inquiry and the account selection of the rewards account; and
    displaying the rewards balance of the rewards account at the interface.

4. The method of claim 1, wherein the account selection comprises the rewards account.

5. The method of claim 4, further comprising:
    displaying the point balance of the rewards account.

6. The method of claim 5, further comprising:
    displaying a conversion rate representing the conversion of one or more points in the rewards account to one or more units of currency.

7. The method of claim 5 further comprising;
    displaying a conversion rate representing the conversion of one or more points in the rewards account to one or more units of rewards.

8. The method of claim 4, further comprising:
    receiving the action selection of the withdrawal action and the account selection of the rewards account;
    displaying a minimum value required to perform the withdrawal action;
    receiving an input from the customer of an amount to withdraw;
    comparing the input to the minimum value;
    prompting the customer for a revised amount that is greater than or equal to the minimum value when the input is less than the minimum value;
    dispensing the amount or the revised amount from the interface; and
    debiting the rewards account in response to the withdrawal action.

9. The method of claim 4, further comprising:
    receiving the action selection of the account transfer and the account selection of the rewards account;
    displaying a minimum value required to perform the account transfer action;
    receiving an input from the customer of an amount and a designated account to receive the account transfer;
    comparing the input to the minimum value;
    prompting the customer, by a computer processor, for a revised amount that is greater than or equal to the minimum value when the input is less than the minimum value;
    transferring the amount or the revised amount input by the customer from the rewards account to the designated account; and
    debiting the rewards account in response to the account transfer action.

10. The method of claim 9, further comprising:
    wherein the account transfer is performed to a third party's account.

11. The method of claim 4, further comprising:
    receiving the action selection of the withdrawal action and the account selection of the rewards account;
    receiving an input from the customer of an amount to withdraw;
    dispensing the amount, by a computer processor, from the interface;
    debiting the rewards account and at least one additional account in response to the withdrawal action, the at least one additional account being debited for an amount less than the amount; and
    wherein the at least one additional account is debited in response to a predetermined rule configured by the customer prior to the withdrawal action.

12. The method of claim 1, further comprising:
    dispensing a receipt to the customer upon completion of the action performance.

13. The method of claim 12, further comprising:
    placing the rewards balance for the rewards account on the receipt.

14. The method of claim 1, wherein the interface comprises an Automated Teller Machine (ATM).

15. The method of claim 1, wherein the indicia of the reward comprises a random award.

16. The method of claim 1, wherein the indicia comprises a bar code.

17. The method of claim 16, wherein the indicia comprises the bar code and receipt.

18. A computer implemented method for accessing a rewards account and configuring preferences associated therewith comprising:
- receiving an interaction from a customer, wherein the interaction is received via an interface associated with a financial institution and comprises at least identifying information which identifies the customer;
- determining, by at least one computer processor, a customer status comprising determining whether the customer is an existing customer or a potential customer of the financial institution, wherein the existing customer is a present account-holder with the financial institution and the potential customer is not a present account-holder with the financial institution;
- determining, by the at least one computer processor, one or more accounts associated with the customer, wherein the computer processor determines the one or more accounts based on the identity of the customer and the customer status and the one or more accounts comprise at least a rewards account with a rewards balance associated therewith;
- presenting a menu comprising preference information,
- wherein the preference information comprises options relating to the one or more accounts and the options comprise rules regarding processing and maintaining of the one more accounts;
- receiving a selection from the menu;
- receiving a transaction for the one or more accounts;
- applying the selection to the processing of the transaction.

19. The method of claim 18, wherein the interface comprises an Automated Teller Machine (ATM).

20. The method of claim 18, wherein the interface comprises a personal computer.

21. A computer implemented system for accessing a rewards account comprising:
- an interface communicatively coupled to a network and associated with a financial institution;
- one or more processors, communicatively coupled to the interface, configured to perform the following:
    - receive an interaction from a customer, wherein the interaction comprises at least receiving identifying information from the customer;
    - determine a customer status comprising determining whether the customer is an existing customer or a potential customer of the financial institution, wherein the existing customer is a present account-holder with the financial institution and the potential customer is not a present account-holder with the financial institution;
    - determine one or more accounts associated with the customer upon determining the customer status, the one or more accounts comprising at least a rewards account with a rewards balance associated therewith;
    - receive an action selection from the customer wherein the action selection is selected from a presented list of one or more available actions presented based on the customer status;
    - receive an account selection from the one or more available accounts;
    - perform the action selection upon the account selection; and
    - dispense a receipt upon completion of the action performance using a dispenser,
    - wherein the receipt comprises an indicia of a reward, the reward being dispensed to the customer based on one or more preferences pre-determined by the customer.

22. The system of claim 21, wherein the interface comprises an Automated Teller Machine (ATM).

23. The system of claim 21, wherein the interface comprises a personal computer.

24. The system of claim 21, wherein the one or more actions comprise, for an existing customer: a balance inquiry, a withdrawal action, an account transfer, and preferences and the one or more actions comprise, for a potential customer, options to open an account with a rewards account associated therewith.

25. The system of claim 21, wherein the account selection comprises the rewards account.

26. The system of claim 21, the one or more processors further configured to:
- display the point balance of the rewards account.

27. The system of claim 21, the one or more processors further configured to:
- display a conversion rate representing the conversion of one or more points in the rewards account to one or more units of currency.

28. The system of claim 21, wherein the receipt further comprises the rewards balance for the rewards account.

29. A computer implemented system for accessing a rewards account and configuring preferences associated therewith comprising:
- an interface communicatively coupled to a network and associated with a financial institution;
- one or more processors, communicatively coupled to the interface, configured to perform the following:
    - receive an interaction from a customer wherein the interaction comprises at least receiving identifying information from the customer;
    - determine a customer status comprising determining whether the customer is an existing customer or a potential customer of the financial institution, wherein the existing customer is a present account-holder with the financial institution and the potential customer is not a present account-holder with the financial institution;
    - determine one or more accounts associated with the customer based upon the customer status, the one or more accounts comprising at least a rewards account with a rewards balance associated therewith;
    - present a menu comprising preference information,
    - wherein the preference information comprises options relating to the one or more accounts and the options comprise rules regarding processing and maintaining of the one more accounts;
    - receive a selection from the menu;
    - receiving a transaction for the one or more accounts;
    - apply the selection to the processing of the transaction.

30. The system of claim 29, wherein the interface comprises an Automated Teller Machine (ATM).

31. The system of claim 29, wherein the interface comprises a personal computer.

32. A computer-implemented method for accessing a rewards account comprising:
- receiving an interaction from a customer, wherein the interaction is received via an interface associated with a financial institution and comprises at least identifying information which identifies the customer;
- determining, by at least one computer processor, a customer status comprising determining whether the customer is an existing customer or a potential customer of the financial institution, wherein the existing customer is a present account-holder with the financial institution and the potential customer is not a present accountholder with the financial institution;

determining, by the at least one computer processor, one or more accounts associated with the customer, wherein the computer processor determines the one or more accounts based on the identity of the customer and the customer status and the one or more accounts comprise at least a rewards account with a rewards balance associated therewith;

presenting a list comprising one or more actions to the customer, wherein the one or more actions comprise for an existing customer: a balance inquiry, a withdrawal action, an account transfer, and preference configuration and comprise, for a potential customer, options to open an account with a rewards account associated therewith;

receiving an action selection from the customer, wherein the customer performs the action selection from the list;

receiving an account selection from the one or more available accounts, wherein the account selection comprises at least the rewards account;

displaying the point balance of the rewards account;

displaying a conversion rate representing the conversion of one or more points in the rewards account to one or more units of currency or one or more units of rewards;

performing the action selection upon the account selection; and dispensing a receipt upon completion of the action performance, wherein the receipt comprises an indicia of a reward, the reward being dispensed to the customer based on one or more preferences pre-determined by the customer.

* * * * *